US009251088B2

(12) United States Patent
Frey et al.

(10) Patent No.: US 9,251,088 B2
(45) Date of Patent: Feb. 2, 2016

(54) MECHANISMS FOR ELIMINATING A RACE CONDITION BETWEEN A HYPERVISOR-PERFORMED EMULATION PROCESS REQUIRING A TRANSLATION OPERATION AND A CONCURRENT TRANSLATION TABLE ENTRY INVALIDATION

(71) Applicant: International Business Machines Corporation, Armonk, NY (US)

(72) Inventors: Bradly G. Frey, Austin, TX (US);
Michael K. Gschwind, Chappaqua, NY (US); Benjamin Herrenschmidt, Narrabundah (AU)

(73) Assignee: GLOBALFOUNDRIES INC., Grand Cayman (KY)

( * ) Notice: Subject to any disclaimer, the term of this patent is extended or adjusted under 35 U.S.C. 154(b) by 269 days.

(21) Appl. No.: 14/066,717

(22) Filed: Oct. 30, 2013

(65) Prior Publication Data

US 2015/0120985 A1    Apr. 30, 2015

(51) Int. Cl.
| G06F 12/00 | (2006.01) |
| G06F 12/10 | (2006.01) |
| G06F 9/455 | (2006.01) |
| G06F 9/52  | (2006.01) |

(52) U.S. Cl.
CPC ............ *G06F 12/10* (2013.01); *G06F 9/45533* (2013.01); *G06F 9/52* (2013.01); *G06F 12/1009* (2013.01)

(58) Field of Classification Search
CPC . G06F 12/10; G06F 12/1009; G06F 12/1027; G06F 12/109; G06F 9/45533; G06F 9/455

USPC ............................................................. 711/6
See application file for complete search history.

(56) References Cited

U.S. PATENT DOCUMENTS

| 5,845,331 | A  |   | 12/1998 | Carter et al. |
| 6,651,132 | B1 | * | 11/2003 | Traut ...................... G06F 12/10 711/203 |
| 7,210,144 | B2 | * | 4/2007  | Traut .................. G06F 11/3466 703/23 |
| 7,640,543 | B2 | * | 12/2009 | Vij ....................... G06F 12/1491 711/152 |
| 7,650,478 | B2 |   | 1/2010  | Peinado et al. |
| 7,844,446 | B2 |   | 11/2010 | Altman et al. |
| 2002/0082824 | A1 | * | 6/2002 | Neiger ................ G06F 9/45537 704/2 |
| 2004/0117593 | A1 | * | 6/2004 | Uhlig .................... G06F 12/145 711/207 |

(Continued)

*Primary Examiner* — Prasith Thammavong
(74) *Attorney, Agent, or Firm* — Gibb & Riley, LLC; Michael J. LeStrange, Esq.

(57) ABSTRACT

Disclosed are computers and methods employing a mechanism for eliminating a race condition between a hypervisor-performed emulation process and a concurrent translation table entry invalidation. Specifically, on a host machine, a hypervisor controls any guest operating systems. In doing so, the hypervisor emulates an instruction by performing a translation operation to acquire a physical address from a virtual address and, if applicable, further from an effective address using translation table(s) (e.g., page tables and, if applicable, segment tables); accesses the physical address; and completes the instruction. During emulation, flagged address table(s) are used to eliminate the race condition. For example, upon receiving an invalidate translation instruction associated with a virtual address, a determination is made as to whether or not the virtual address appears in a flagged virtual address table and, if so, additional action is taken to prevent an error in the translation.

20 Claims, 12 Drawing Sheets

(56) References Cited

U.S. PATENT DOCUMENTS

| | | |
|---|---|---|
| 2010/0058358 A1 | 3/2010 | Franke et al. |
| 2010/0274987 A1* | 10/2010 | Subrahmanyam .. G06F 12/1036 711/207 |
| 2012/0284465 A1 | 11/2012 | Frey et al. |
| 2012/0297109 A1 | 11/2012 | Guthrie et al. |
| 2013/0124826 A1 | 5/2013 | Merchant et al. |
| 2013/0174148 A1 | 7/2013 | Amit et al. |
| 2013/0185739 A1 | 7/2013 | Farrell et al. |

* cited by examiner

MECHANISMS FOR ELIMINATING A RACE CONDITION BETWEEN A HYPERVISOR-PERFORMED EMULATION PROCESS REQUIRING A TRANSLATION OPERATION AND A CONCURRENT TRANSLATION TABLE ENTRY INVALIDATION

BACKGROUND

The computers and methods disclosed herein relate to hypervisor-controlled virtualization and, more particularly, to computers and methods that employ a mechanism for eliminating a race condition between a hypervisor-performed emulation process requiring a translation operation using one or more different types of translation tables (e.g., page tables and, if applicable, segment tables), and a concurrent translation table entry invalidation.

Virtualization refers to a state where multiple operating systems, including hypervisor and one or more guest operating systems, are concurrently executed by one or more processor(s) on the same computer, referred to herein as a host machine. A hypervisor is a host operating system that supports such virtualization. Specifically, the hypervisor controls execution of the guest operating system(s) by the processor(s) of the host machine in order to ensure that the guest operating system(s) can function without disruption.

With such virtualization, there are many scenarios in which the hypervisor must emulate instructions for a given guest operating system. Such instructions can include, for example, instructions that require access to data stored in memory (referred to herein as storage access instructions). To emulate a storage access instruction, the hypervisor typically manually translates (in software) a virtual address associated with the instruction into a physical address. To do this, the hypervisor performs a page table walk (also referred to herein as a page table search), during which one or more page tables are searched using a virtual address associated with the storage access instruction as a search key in order to acquire an actual physical address. Those skilled in the art will recognize that, depending upon the type of memory management being used, the virtual address may be specified in the storage access instruction or, alternatively, an effective address may be specified. If an effective address is specified, the hypervisor must first manually translate (in software) the effective address into the virtual address by performing a segment table walk (also referred to herein as a segment table search), during which one or more segment tables are searched using the effective address associated with the storage access instruction as a search key in order to acquire the virtual address. In any case, once the virtual address is acquired, it can be translated into the actual physical address, as discussed above. For purposes of this disclosure, it should be understood that page tables and segment tables are different types of "translation tables". Once the actual physical address is acquired, the hypervisor can access the physical address and complete the instruction, thereby completing the emulation process.

However, from the time this emulation process begins until the time that it is completed (i.e., until the physical address is accessed and the instruction is completed), there is a possibility that a required translation table entry (e.g., a required page table entry or, if applicable, a required segment table entry) used for the translation could be invalidated by any one of the multiple operating systems such that the physical address acquired and used to complete the instruction is no longer accurate. The condition of having to complete an emulation process before an invalidation of a required translation table entry is referred to herein as a race condition and, because the inability to complete the emulation process before translation table entry invalidation occurs can disrupt guest operating system operations, there is a need in the art for a mechanism that eliminates such race conditions.

SUMMARY

In view of the foregoing, disclosed herein are computers and methods that employ a mechanism for eliminating a race condition between a hypervisor-performed emulation process requiring a translation operation using one or more different types of translation tables (e.g., page tables and, if applicable, segment tables), and a concurrent translation table entry invalidation. Specifically, in the systems and methods, a hypervisor executed by a host processor controls at least one guest operating system also executed by the host processor. In controlling the guest operating system(s), the hypervisor can receive a storage access instruction associated with a specific virtual address (or, alternatively, associated with a specific effective address) and can emulate that storage access instruction. To emulate the storage access instruction, the hypervisor can perform a translation operation to acquire a specific physical address based on the address specified in the storage access instruction using one or more page tables and, if applicable, segment tables. The hypervisor can then access the specific physical address and complete the instruction. During emulation, flagged address table(s) can be used to eliminate the race condition. For example, any address(es) associated with a storage access instruction can be stored in flagged address table(s) and, upon receiving an invalidate translation instruction, a determination can be made as to whether or not the address associated with the invalidate translation instruction appears in a flagged address table. If so, additional action can be taken to prevent an error in the translation. After emulation of the storage access instruction, the address(es) associated with the storage access instruction can be cleared from the flagged address table(s).

More particularly, disclosed herein is a computer that is configured for hypervisor-controlled virtualization and that employs a mechanism for eliminating a race condition between a hypervisor-performed emulation process requiring a translation operation using one or more page tables and a concurrent page table entry invalidation. Specifically, the computer can comprise a processor that concurrently executes a hypervisor (i.e., a host operating system that supports virtualization) and at least one guest operating system. The computer can further comprise at least one memory that is accessible by the processor. The computer can further comprise a flag management unit that is in communication with the processor and that is operably connected to a flagged virtual address table that stores flagged virtual addresses. The flagged virtual address table can be stored locally (i.e., within the flag management unit) or, alternatively, can be stored within memory. The computer can further comprise, stored in memory, at least one page table that associates virtual addresses with physical addresses in the at least one memory.

When the processor concurrently executes the guest operating system(s) and the hypervisor, the hypervisor can control execution of the guest operating system(s) by the processor in order to ensure that the guest operating system(s) can function without disruption. For example, the hypervisor can perform the following processes. The hypervisor can receive, from a given guest operating system, a storage access instruction that requires translation of a first virtual address into a physical address in the at least one memory. Upon receiving such a storage access instruction, the hypervisor can transmit, to the flag management unit, a set flag instruction, thereby causing the flag management unit to add the first virtual address to the flagged virtual address table. After transmitting the set flag instruction, the hypervisor can emulate the storage access instruction. That is, the hypervisor can translate the first virtual address into the physical address using the page table(s). The hypervisor can then access the physical address and complete the storage access instruction.

During this emulation process, the flag management unit alone or the flag management and another component of the computer, can take preventative action, if necessary, to avoid translation errors. Specifically, the flag management unit can receive an invalidate translation instruction (e.g., a translation look-aside buffer invalidate entry (TLBIE) instruction), which is associated with a second virtual address and which was broadcast by either the hypervisor or the given guest operating system. Upon receipt of such an invalidate translation instruction, the flag management unit can compare the second virtual address to the flagged virtual addresses stored in the flagged virtual address table. When a match is found between the second virtual address and the first virtual address stored in the flagged virtual address table, the flag management unit alone or, alternatively, the flag management unit and another component of the computer can take additional action to prevent an error in the translation. For example, the flag management unit can delay the translation invalidation itself. Alternatively, the flag management unit can transmit a conflict notification to the specific operating system (i.e., either the hypervisor or the given guest operating system) that broadcast the invalidate translation instruction and that specific operating system can take further action. Alternatively, the flag management unit can transmit a conflict notification to the hypervisor, regardless of whether the hypervisor broadcast the invalidate translation instruction or not, and the hypervisor can take further action.

In any case, once the hypervisor has completed the emulation process, it can transmit a clear flag instruction to the flag management unit, thereby causing the flag management unit to clear the first virtual address from the flagged virtual address table.

The computer described above is configured so that emulation of a storage access instruction requires a single-stage translation from a virtual address to a physical address using a single type of translation table and, particularly, page table(s). However, those skilled in the art will recognize that oftentimes computers are configured so that emulation of a storage access instruction requires a multi-stage translation from, for example, an effective address to a virtual address to a physical address and such a multi-stage translation may require multiple different types of translation tables, for example, segment table(s) and page table(s). Thus, it should be understood that the mechanism disclosed herein to eliminate a race condition and, thereby eliminate a translation error can also be employed when such a multi-stage translation is required.

Thus, also disclosed herein is a computer that is configured for hypervisor-controlled virtualization and that employs a mechanism for eliminating a race condition between a hypervisor-performed emulation process requiring a multi-stage translation operation using different types of translation tables (e.g., one or more segment tables as well as one or more page tables) and a concurrent translation table entry invalidation. In this case, the computer can similarly comprise a processor that concurrently executes a hypervisor (i.e., a host operating system that supports virtualization) and at least one guest operating system. The computer can further comprise at least one memory accessible by the processor. The computer can further comprise a flag management unit that is in communication with the processor and that is operably connected to at least one flagged address table that stores flagged effective addresses and flagged virtual addresses (e.g., a flagged address table that stores both flagged effective addresses and flagged virtual addresses or, alternatively, both a flagged effective address table that stores flagged effective addresses and a flagged virtual address table that stores flagged virtual addresses). The flagged address table(s) can be stored locally (i.e., within the flag management unit) or, alternatively, can be stored within memory. The computer can further comprise, stored in memory, at least one segment table that associates effective addresses with virtual addresses and at least one page table that associates virtual addresses with physical addresses in the at least one memory.

When the processor concurrently executes the guest operating system(s) and the hypervisor, the hypervisor can control execution of the guest operating system(s) by the processor in order to ensure that the guest operating system(s) can function without disruption. For example, the hypervisor can perform the following processes. The hypervisor can receive, from a given guest operating system, a storage access instruction that requires translation of a first effective address into a physical address in the at least one memory. Upon receiving such a storage access instruction, the hypervisor can transmit, to the flag management unit, a first set flag instruction, thereby causing the flag management unit to add the first effective address to the flagged address table(s) (e.g., to the flagged effective address table). After transmitting the set first flag instruction, the hypervisor can emulate the storage access instruction. That is, the hypervisor can translate the first effective address to a first virtual address using the segment table(s). Upon translation of the first effective address into the first virtual address, the hypervisor can transmit a second set flag instruction to the flag management unit, thereby causing the flag management unit to add the first virtual address to the flagged address table(s) (e.g., to the flagged virtual address table). Additionally, the hypervisor can translate the first virtual address into the physical address using the page table(s). The hypervisor can then access the physical address and complete the storage access instruction.

During this emulation process, the flag management unit alone or, alternatively, the flag management unit and another component of the computer can preventative take action, if necessary, to avoid translation errors. Specifically, the flag management unit can receive an invalidate translation instruction (e.g., a segment look-aside buffer invalidate entry (SLBIE) instruction or a translation look-aside buffer invalidate entry (TLBIE) instruction), which is associated with a second address (e.g., either a second effective address or a second virtual address) and which was broadcast by either the hypervisor or the given guest operating system. Upon receipt of such an invalidate translation instruction, the flag management unit can compare the second address to the flagged addresses stored in the flagged address table(s). When a match is found between the second address and either the first effective address or the first virtual address stored in the flagged address table(s), the flag management unit alone or, alternatively, the flag management unit and another component of the computer can take additional action to prevent an error in the translation. For example, the flag management unit can delay the translation invalidation itself. Alternatively, the flag management unit can transmit a conflict notification to the specific operating system (i.e., either the hypervisor or the given guest operating system) that broadcast the invalidate translation instruction and that specific operating system can take further action. Alternatively, the flag management unit can transmit a conflict notification to the hypervisor, regardless of whether the hypervisor broadcast the invalidate translation instruction or not, and the hypervisor can take further action.

In any case, once the hypervisor has completed the emulation process, it can transmit a clear flags instruction to the flag management unit, thereby causing the flag management unit to clear the first effective address and the first virtual address from the flagged address table(s).

Also disclosed herein is a method for operating a computer configured for hypervisor-controlled virtualization and for eliminating a race condition between a hypervisor-performed emulation process requiring a translation operation using one or more page tables and a concurrent page table entry invalidation. This method can comprise concurrently executing, by a processor, a hypervisor (i.e., a host operating system that supports virtualization) and at least one guest operating system. When the hypervisor and the guest operating system(s) are concurrently executed, the following processes can be performed in order control execution of the guest operating system(s) and, thereby ensure that the guest operating system(s) can function without disruption.

Specifically, the method can further comprise receiving, by the hypervisor from a given guest operating system, a storage access instruction, which requires translation of a first virtual address into a physical address in at least one memory. Upon receipt of the storage access instruction, a set flag instruction can be transmitted, by the hypervisor to a flag management unit, thereby causing the flag management unit to add the first virtual address to a flagged virtual address table that stores flagged virtual addresses. Then, the storage access instruction can be emulated by the hypervisor.

The process of emulating the storage access translating the first virtual address into a physical address using at least one page table, which associates virtual addresses with physical addresses in the at least one memory. Then the physical address can be accessed per the storage access instruction and the storage access instruction can be completed.

During this emulation process, preventative action can be taken, if necessary, to avoid translation errors. Specifically, if, during the emulation process, an invalidate translation instruction (e.g., a translation look-aside buffer invalidate entry (TLBIE) instruction), which is associated with a second virtual address and which was broadcast by either the hypervisor or the given guest operating system, is received by the flag management unit, the second virtual address can be compared, by the flag management unit, to the flagged virtual addresses stored in the flagged virtual address table. When a match is found between the second virtual address and the first virtual address stored in the flagged virtual address table, additional action can be taken by the flag management unit alone or, alternatively, by the flag management unit and another component of the computer, to prevent an error in the translation. For example, invalidation of the translation can be delayed by the flag management unit itself. Alternatively, a conflict notification can be transmitted by the flag management unit to the specific operating system (i.e., either the hypervisor or the guest operating systems) that broadcast the invalidate translation instruction and further action can be taken by that specific operating system. Alternatively, a conflict notification can be transmitted by the flag management unit to the hypervisor, regardless of whether the hypervisor broadcast the invalidate translation instruction or not, and further action can be taken by the hypervisor.

In any case, once the emulation process has been completed, a clear flag instruction can be transmitted, by the hypervisor to the flag management unit, thereby causing the flag management unit to clear the first virtual address from the flagged virtual address table.

In the method described above, emulation of a storage access instruction requires only a single-stage translation from a virtual address to a physical address using a single type of translation table and, particularly, page table(s). However, those skilled in the art will recognize that oftentimes emulation of a storage access instruction requires a multi-stage translation from, for example, an effective address to a virtual address to a physical address and such a multi-stage translation may require multiple different types of translation tables, for example, segment table(s) and page table(s). Thus, it should be understood that the mechanism disclosed herein to eliminate a race condition and, thereby eliminate a translation error can also be employed when such a multi-stage translation is required.

Thus, also disclosed herein is another method for operating a computer that is configured for hypervisor-controlled virtualization and for eliminating a race condition between a hypervisor-performed emulation process requiring a multi-stage translation operation using different types of translation tables (e.g., one or more segment tables as well as one or more page tables) and a concurrent translation table entry invalidation. In this case, the method can similarly comprise concurrently executing, by a processor, a hypervisor (i.e., a host operating system that supports virtualization) and at least one guest operating system. When the hypervisor and the guest operating system(s) are concurrently executed, the following processes can be performed in order to control execution of the guest operating system(s) and, thereby ensure that the guest operating system(s) can function without disruption.

Specifically, the method can further comprise receiving, by the hypervisor from a given guest operating system, a storage access instruction requiring translation of a first effective address into a physical address in at least one memory. Upon receipt of the storage access instruction, a first set flag instruction can be transmitted, by the hypervisor to the flag management unit, thereby causing the flag management unit to add the first effective address to at least one flagged address table that stores flagged addresses. It should be noted that a single flagged address table can store both flagged effective addresses and flagged virtual addresses. Alternatively, the at least one flagged address table can comprise a flagged effective address table that stores flagged effective addresses and a flagged virtual address table that stores flagged virtual addresses.

In any case, the storage access instruction can be emulated by the hypervisor. The process of emulating the storage access instruction can comprise translating the first effective address into a first virtual address using at least one segment table, which associates effective addresses with virtual addresses. Once the first virtual address is acquired, a second set flag instruction can be transmitted to the flag management unit, thereby causing the flag management unit to add the first virtual address to the at least one flagged address table (e.g., to the flagged virtual address table, if applicable). Additionally, the first virtual address can be translated into the physical address using at least one page table, which translates virtual addresses into physical addresses in the at least one memory. Once the physical address is acquired, it can be accessed according to the storage access instruction and the storage access instruction can be completed.

During this emulation process, action can be taken, if necessary, to prevent translation errors. Specifically, if, during the emulation process, an invalidate translation instruction (e.g., a segment look-aside buffer invalidate entry (SLBIE)

instruction or a translation look-aside buffer invalidate entry (TLBIE) instruction), which is associated with a second address (e.g., either a second effective address or a second virtual address) and which was broadcast by either the hypervisor or the given guest operating system, is received by the flag management unit, the second address can be compared, by the flag management unit, to the flagged addresses stored in the flagged address table(s). When a match is found between the second address and either the first effect address or the first virtual address, additional action can be taken, by the flag management unit alone or, alternatively, by the flag management unit and another component of the computer, to prevent an error in the translation. For example, invalidation of the translation can be delayed by the flag management unit itself. Alternatively, a conflict notification can be transmitted by the flag management unit to the specific operating system (i.e., either the hypervisor or the guest operating systems) that broadcast the invalidate translation instruction and further action can be taken by that specific operating system. Alternatively, a conflict notification can be transmitted by the flag management unit to the hypervisor, regardless of whether the hypervisor broadcast the invalidate translation instruction or not, and further action can be taken by the hypervisor.

In any case, once the emulation process has been completed, a clear flags instruction can be transmitted, by the hypervisor to the flag management unit, thereby causing the flag management unit to clear the first effective address and the first virtual address from the flagged address table(s).

Also disclosed herein is a computer program product. This computer program product can comprise a computer readable storage medium that stores a hypervisor. This hypervisor can be executable by a processor of a computer to perform the above-described method steps associated with the hypervisor.

BRIEF DESCRIPTION OF THE DRAWINGS

The embodiments herein will be better understood from the following detailed description with reference to the drawings, which are not necessarily drawn to scale and in which.

DETAILED DESCRIPTION

Figure 1:
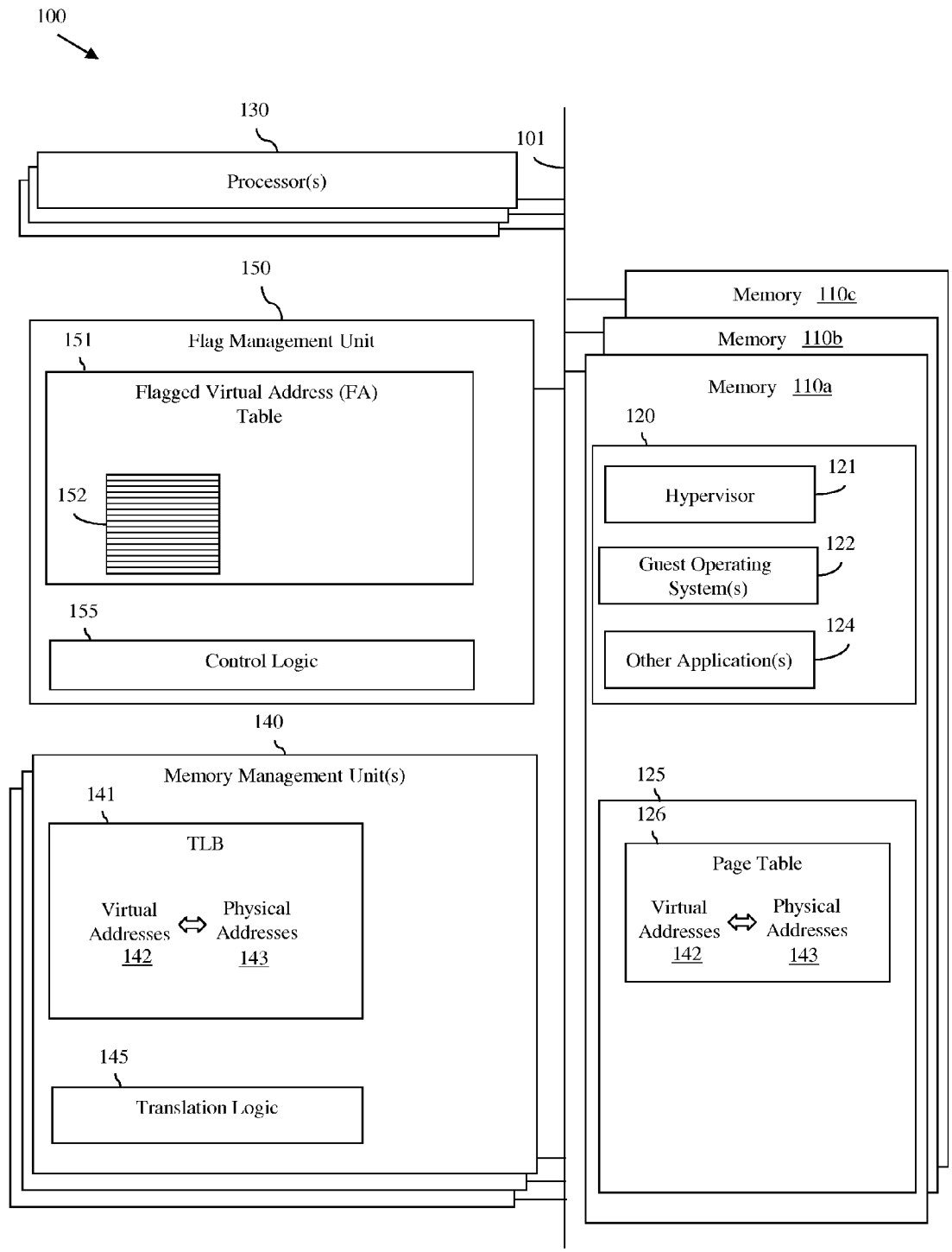
FIG. 1 is a schematic diagram illustrating a computer configured for hypervisor-controlled virtualization.

As mentioned above, virtualization refers to a state where multiple operating systems, including a hypervisor and one or more guest operating systems, are concurrently executed by one or more processor(s) on the same computer, referred to herein as a host machine. A hypervisor is a host operating system that supports such virtualization. Specifically, the hypervisor controls execution of the guest operating system(s) by the processor(s) of the host machine in order to ensure that the guest operating system(s) can function without disruption.

With such virtualization, there are many scenarios in which the hypervisor must emulate instructions for a given guest operating system. Such instructions can include, for example, instructions that require access to data stored in memory (referred to herein as storage access instructions). To emulate a storage access instruction, the hypervisor typically manually translates (in software) a virtual address associated with the instruction into a physical address. To do this, the hypervisor performs a page table walk (also referred to herein as a page table search), during which one or more page tables are searched using a virtual address associated with the storage access instruction as a search key in order to acquire an actual physical address. Those skilled in the art will recognize that, depending upon the type of memory management being used, the virtual address may be specified in the storage access instruction or, alternatively, an effective address may be specified. If an effective address is specified, the hypervisor must first manually translate (in software) the effective address into the virtual address by performing a segment table walk (also referred to herein as a segment table search), during which one or more segment tables are searched using the effective address associated with the storage access instruction as a search key in order to acquire the virtual address. In any case, once the virtual address is acquired, it can be translated into the actual physical address, as discussed above. For purposes of this disclosure, it should be understood that page tables and segment tables are different types of "translation tables". Once the actual physical address is acquired, the hypervisor can access the physical address and complete the instruction, thereby completing the emulation process.

However, from the time this emulation process begins until the time that it is completed (i.e., until the physical address is accessed and the instruction is completed), there is a possibility that a required translation table entry (e.g., a required page table entry or, if applicable, a required segment table entry) used for the translation could be invalidated by any of the multiple operating systems such that the physical address acquired and used to complete the instruction is no longer accurate. The condition of having to complete an emulation process before an invalidation of a required translation table entry is referred to herein as a race condition.

The inability to complete the emulation process before table entry invalidation occurs can disrupt guest operating systems. Techniques for solving this problem include, but are not limited to, using intra-processor interrupts (IPIs), using translation look-aside buffer invalidate entry (TLBIE) instructions, using translation change instructions and/or requiring translation invalidations to be hypervisor-privileged has also been used to solve this problem. Unfortunately, these techniques are costly in terms of performance. Alternatively, the hypervisor could be configured to use the context of the originating software to perform some types of storage accesses. Doing so would avoid race condition exposure for some types of storage accesses, but with limitations, and generally this technique is not suitable for emulation of accesses to hardware devices.

In view of the foregoing, disclosed herein are computers and methods that employ a mechanism for eliminating a race condition between a hypervisor-performed emulation process requiring a translation operation using one or more different types of translation tables (e.g., page tables and, if applicable, segment tables), and a concurrent translation table entry invalidation. Specifically, in the computers and methods, a hypervisor executed by a host processor controls at least one guest operating system also executed by the host processor. In controlling the guest operating system(s), the hypervisor can receive a storage access instruction associated with a specific virtual address (or, alternatively, associated with a specific effective address) and can emulate that storage access instruction. To emulate the storage access instruction, the hypervisor can perform a translation operation to acquire a specific physical address based on the address specified in the storage access instruction using one or more page tables and, if applicable, segment tables. The hypervisor can then access the specific physical address and complete the instruction. During emulation, flagged address table(s) can be used to eliminate the race condition. For example, any address(es) associated with a storage access instruction can be stored in flagged address table(s) and, upon receiving an invalidate translation instruction, a determination can be made as to whether or not the address associated with the invalidate translation instruction appears in a flagged address table. If so, additional action can be taken to prevent an error in the translation. After emulation of the storage access instruction, the address(es) associated with the storage access instruction can be cleared from the flagged address table(s).

More particularly, referring to FIG. 1, disclosed herein is a computer 100 that is configured for hypervisor-controlled virtualization and that employs a mechanism for eliminating a race condition between a hypervisor-performed emulation process requiring a translation operation using one or more page tables and a concurrent page table entry invalidation. This computer 100 can be implemented, for example, in a computer hardware environment such as that described in detail below and depicted in FIG. 12. Alternatively, the computer 100 could be implemented on any other computerized device or network of devices having the required storage and processing capability to perform the described processes (e.g., a laptop computer, a tablet computer, etc.).

The computer 100 can comprise at least one memory 110a-c and at least one processor 130.

For illustration purposes, three memories are shown. These memories can include, for example, a first memory 110a (also referred to herein as a main memory or primary memory) and one or more second memories 110b-c (also referred to herein as secondary memories). The second memories 110b-c can comprise, for example, any form of additional memory accessible by the processor(s) 130. For example, the second memories 110b-c can comprise any of flash memories, optical discs, magnetic disks, magnetic tapes, etc. However, it should be understood that FIG. 1 is not intended to be limiting and that the computer 100 can, alternatively, comprise any number of one or more memories.

The at least one memory 110a-c can store (i.e., can be adapted to store, can be configured to store, etc.) information including, but not limited to, software 120 and data 125. The software 120 can comprise, for example, a hypervisor 121 (i.e., a host operating system that supports virtualization), at least one guest operating system 122, and any other software applications 124. The data 125 can comprise table(s) 126 (as discussed in greater detail below) and any other form of data. In the case of multiple memories, the software 120 and data 125 can be dispersed between the multiple memories 110a-c. For example, the first memory 110a can store the hypervisor 121, one or more guest operating systems 122, and one or more other software applications 124. The second memories 110b-c can, for example, each store a guest operating system 122 and/or other software application(s) 124.

As mentioned above, the computer 100 can also comprise one or more processors 130 (e.g., central processing units (CPUs)). These processor(s) 130 can access (e.g., can be adapted to access, can be configured to access, etc.) the first memory 110a and, if applicable, any second memories 110b-c (e.g., over a system bus 101 or over any wired or wireless communication network (not shown)). For illustration purposes, three processors 130 are shown. However, it should be understood that FIG. 1 is not intended to be limiting and that the computer 100 can, alternatively, comprise any number of one or more processors 130.

At least one processor 130 can concurrently execute (i.e., can be adapted to concurrently execute, configured to concurrently execute, etc.) the hypervisor 121 and the guest operating system(s) 122 so as to allow for virtualization. It should be noted that storage, particularly, of the guest operating system(s) 122, in memory can be achieved using a paging memory-management scheme. Those skilled in the art will recognize that with such a scheme, a guest operating system 122 can use a corresponding virtual memory and instructions for processes to be performed by that guest operating system 122 can appear to be stored in contiguous sections of the corresponding virtual memory. However, in actuality, pages (i.e., blocks) of memory storing those instructions can be dispersed across different areas within first memory 110a and, if applicable, any second memories 110b-c.

In order to implement this paging memory-management scheme, the computer 100 can further comprise at least one page table 126 that is stored in memory (e.g., in the first memory 110a) and that associates virtual addresses 142 with physical addresses 143 in the first memory 110a and, if applicable, in any second memories 110b-c. That is, the page table(s) 126 can map virtual addresses 142 to corresponding physical addresses 143 in the first memory 110a and, if applicable, in any second memories 110b-c.

Additionally, the computer 100 can further comprise at least one memory management unit 140 that is operably connected to the page table(s) 126 and that is in communication with the processor 130 (e.g. over the system bus 101). Those skilled in the art will recognize that, typically, computers that use paging memory-management schemes comprise discrete memory management units associated with each processor. In any case, the memory management unit 140 can comprise translation logic 145 and a translation look-aside buffer (TLB) 141 used to enhance translation speed. Specifically, the TLB 141 can be implemented, for example, as a content addressable memory (CAM) that has a fixed number of slots that contain page table entries, which associate virtual addresses 142 with physical addresses 143. That is, the TLB 141 is a cache of the page table(s) 126. The translation logic 145 can control operations (i.e., can be adapted to control operations, can be configured to control operations, etc.) of the TLB 141 and page table(s) 126. These operations can include, but are not limited to, search operations, such as TLB search operations and page table walk-throughs (also referred to herein as page table search operations), which are performed when a TLB search operation does not produce a hit); invalidate entry operations; modify entry operations; etc., performed, for example, in response to instructions received from the hypervisor 121 or a guest operating system 122.

The computer 100 can further comprise a flag management unit 150 that is in communication with the processor 130 and that is operably connected to a flagged virtual address table 151 (e.g., over the system bus 101). The flagged virtual address table 151 can store (e.g., can be adapted to store, can be configured to store, etc.) flagged virtual addresses 152. The flagged virtual address table 151 can be stored locally, for example, in a register within the flag management unit 150, as shown. Alternatively, the flagged virtual address table 151 can be stored in memory (e.g., in the first memory 110a). The flag management unit 150 can further comprise control logic 155 that controls operations (i.e., that is adapted to control operations, that is configured to control operations, etc.) of the flagged virtual address table 151 including, but not limited to, set flag operations, compare address operations, and clear flag operations (as discussed in greater detail below).

When the processor 130 concurrently executes the hypervisor 121 and the guest operating system(s) 122, the hypervisor 121 can control execution (i.e., can be adapted to control execution, can be configured to control execution, can comprise a program of instructions that when executed by the processor 130 can control execution, etc.) of the guest operating system(s) 122 by the processor 130 in order to ensure that the guest operating system(s) 122 can function without disruption. For example, the hypervisor 121 or, more particularly, the processor 130 through execution of the hypervisor 121, can perform the following processes. The hypervisor 121 can receive, from a given guest operating system 122, a storage access instruction that requires translation of a first virtual address into a physical address in the first memory 110a or, if applicable, in any of the second memories 110b-c.

Upon receiving such a storage access instruction, the hypervisor 121 can transmit, to the flag management unit 150 (e.g., over the system bus 101), a set flag instruction, thereby causing the flag management unit 150 and, particularly, the control logic 155 thereof to add the first virtual address to the list of flagged virtual addresses 152 in the flagged virtual address table 151. After transmitting the set flag instruction, the hypervisor 121 can emulate the storage access instruction. That is, the hypervisor 121 can translate the first virtual address into the physical address using the page table(s) 126 by performing a page table walk-through using the first virtual address as a search key in order to search the page table(s) 126 and acquire the physical address. Once the physical address is acquired, the hypervisor 121 can access the physical address in the appropriate memory 110a-c and can complete the storage access instruction, as required, thereby completing the emulation process.

However, during the emulation process, in order to eliminate a race condition between the translation operation performed by the hypervisor 121 and a concurrent translation invalidation by the hypervisor 121 or the given guest operating system 122 and, thereby to prevent a translation error, the flag management unit 150 alone or, alternatively, the flag management unit 150 and another component of the computer 100 can take preventative action, if necessary. Specifically, as discussed in greater detail below, a flag, when set (i.e., when added to the list of flagged virtual addresses 152 in the flagged virtual address table 151), can trigger preventative action(s) if/when the hypervisor 121 or the given guest operating system 122 and, particularly, a thread of execution by the hypervisor 121 or the given guest operating system 122 attempts to invalidate a translation at issue and, particularly, to invalidate a page table entry, which is required for performance of the translation.

More specifically, during the emulation process, the flag management unit 150 can receive (i.e., can be adapted to receive, can be configured to receive, etc.) an invalidate translation instruction (e.g., a translation look-aside buffer invalidate entry (TLBIE) instruction), which is associated with a second virtual address and which was broadcast (e.g., over the system bus 101) by either the hypervisor 121 or the given guest operating systems 122. Those skilled in the art will recognize that typically an operating system (e.g., the hypervisor 121 or the given guest operating system 122) can initiate invalidation of a page table entry by first broadcasting a translation look-aside buffer invalidate entry (TLBIE) instruction. This is followed by invalidation, by the hypervisor 121 or the given guest operating system 122, of the corresponding page table entry. Thus, detection by the flag management unit 150 of a TLBIE instruction can be an indication that a particular page table entry associated with the second virtual address is going to be invalidated or modified.

Upon receipt of such an invalidate translation instruction, the flag management unit 150 and, particularly, the control logic 155 thereof can compare (i.e., can be adapted to compare, can be configured to compare, etc.) the second virtual address to the flagged virtual addresses 152 (including the first virtual address) stored in the flagged virtual address table 151. When a match is found (i.e., when the second virtual address matches the first virtual address stored in the flagged virtual address table 151), the flag management unit 150 or the flag management unit 150 and another component of the computer 100 can take additional action to prevent an error in the translation.

For example, when a match is found (i.e., when the second virtual address matches the first virtual address stored in the flagged virtual address table 151), the flag management unit 150 itself can take additional action to delay translation invalidation until the flag is cleared (i.e., until the first virtual address is removed from the flagged virtual address table 151).

Alternatively, when a match is found (i.e., when the second virtual address matches the first virtual address stored in the flagged virtual address table 151), the flag management unit 150 can transmit (e.g., over the system bus 101) a conflict notification (i.e., can be adapted to transmit a conflict notification, can be configured to transmit a conflict notification, etc.) to that operating system (i.e., the hypervisor 121 or the given guest operating system 122, as applicable) which originally broadcast the invalidate translation instruction (e.g., the TLBIE instruction). In this case, that operating system (i.e., the hypervisor 121 or the given guest operating system 122, as applicable), which originally broadcast the invalidate translation instruction and which received a conflict notification, can take further action (i.e., can be adapted to take further action, can be configured to take further action, etc.) in response to the conflict notification in order to prevent a translation error. Such action can include, for example, delaying translation invalidation (i.e., delaying invalidation of the page table entry) until the flag is cleared, repeatedly causing the invalidate translation instruction to restart until the flag is cleared, and delaying an acknowledgement until the flag is cleared.

It should be noted that, optionally, the operating system (i.e., the hypervisor 121 or the given guest operating system 122, as applicable), which broadcast the invalidate translation instruction and which received the conflict notification, can recognize (i.e., can be adapted to ensure recognition of, can be configured to ensure recognition of, etc.) a perpetual conflict state. That is, this operating system can determine (i.e., can be adapted to determine, can be configured to determine, etc.) when the flag on the virtual address does not clear (i.e., when the virtual address is not removed from the flagged virtual address table 151) either after a predetermined period of time or after a predetermined number of times restarting the invalidate translation instruction. When the operating system, which broadcast the invalidate translation instruction and which received the conflict notification, is the hypervisor 121, the hypervisor 121 can take additional action (i.e., can be adapted to take additional action, can be configured to take additional action, etc.) to overcome this perpetual conflict state. Such action can include, for example, delaying the emulation process until the invalidate translation process is performed or, if necessary, restarting the emulation process after the invalidate translation process is performed. When the operating system, which broadcast the invalidate translation instruction and which received the conflict notification, is the given guest operating system 122, this given guest operating system 122 can transmit (i.e., can be adapted to transmit, can be configured to transmit, etc.) a forward progress interrupt to the hypervisor 121 and the hypervisor 121 can, in response to the forward progress interrupt, take additional action (i.e., can be adapted to take additional action, can be configured to take additional action, etc.) to overcome the perpetual conflict state. Again, such preventative action can include, for example, delaying the emulation process until the invalidate translation process is performed or, if necessary, restarting the emulation process after the invalidate translation process is performed.

Alternatively, regardless of which operating system broadcast the invalidate translation instruction, when a match is found (i.e., when the second virtual address matches the first virtual address stored in the flagged virtual address table 151), the flag management unit 150 can transmit (e.g., over the system bus 101) a conflict notification (i.e., can be adapted to transmit a conflict notification, can be configured to transmit a conflict notification, etc.) to the hypervisor 121. In this case, the hypervisor 121 can take further action (i.e., can be adapted to take further action, can be configured to take further action, etc.) in response to the conflict notification in order to prevent a translation error. Such preventative action can include, for example, delaying the emulating process, when translation has yet to be performed, or repeating the emulating process, when the translation has already occurred.

In any case, once the hypervisor 121 has completed the emulation process it can transmit a clear flag instruction to the flag management unit 150, thereby causing the flag management unit 150 and, particularly, the control logic 155 thereof to clear the first virtual address from the flagged virtual address table 151.

The computer 100 described above is configured so that emulation of a storage access instruction requires a single-stage translation from a virtual address to a physical address using a single type of translation table and, particularly, page table(s). However, those skilled in the art will recognize that oftentimes computers are configured so that emulation of a storage access instruction requires a multi-stage translation from, for example, an effective address to a virtual address to a physical address and such a multi-stage translation may require multiple different types of translation tables, for example, segment table(s) and page table(s). Thus, it should be understood that the mechanism disclosed herein to eliminate a race condition and, thereby eliminate a translation error can also be employed when such a multi-stage translation is required.

Figure 2:
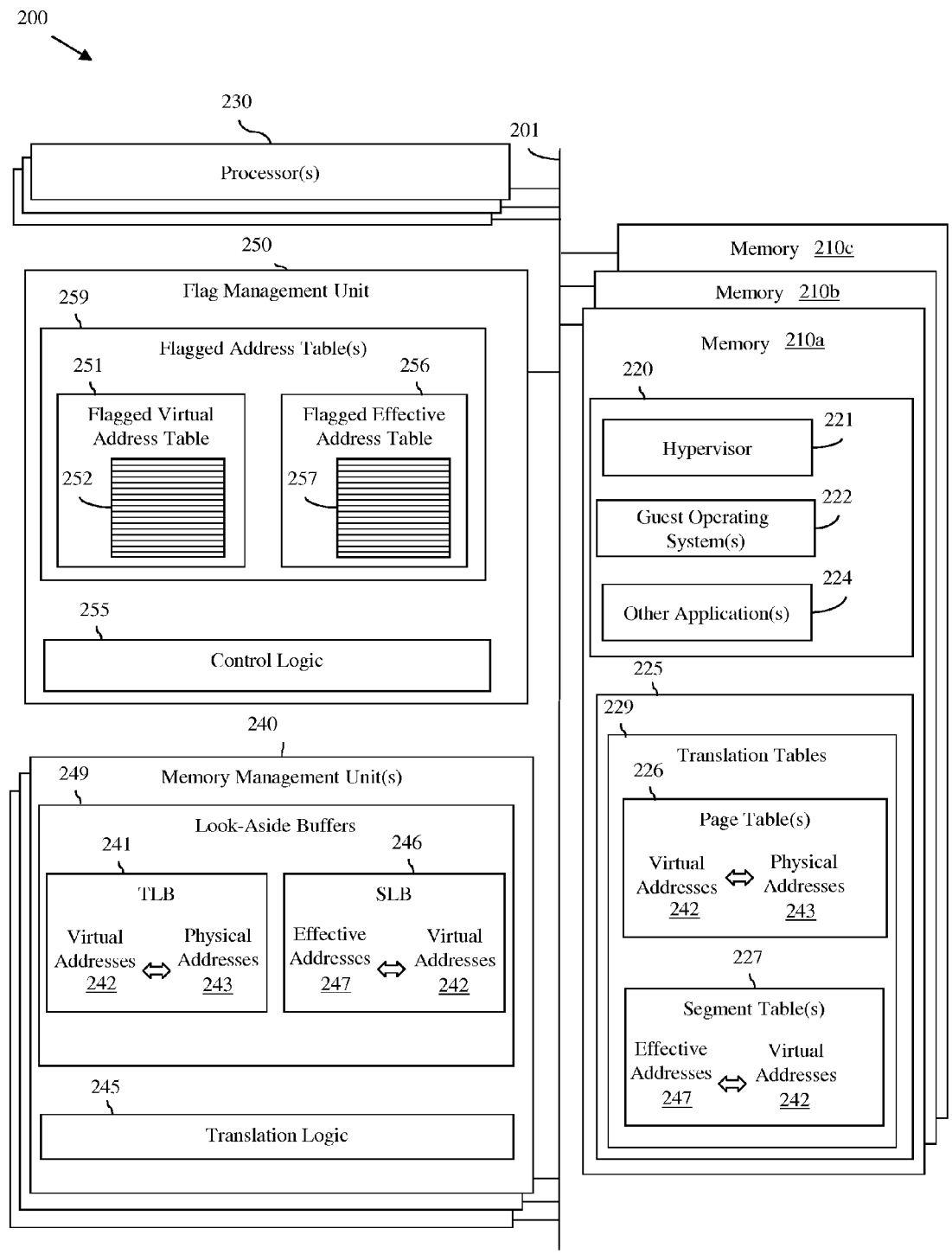
FIG. 2 is a schematic diagram illustrating another computer configured for hypervisor-controlled virtualization.

Thus, referring to FIG. 2, also disclosed herein is a computer 200 that is configured for hypervisor-controlled virtualization and that employs a mechanism for eliminating a race condition between a hypervisor-performed emulation process requiring a multi-stage translation operation using different types of translation tables (e.g., one or more segment tables as well as one or more page tables) and a concurrent translation table entry invalidation (e.g., either a concurrent page table entry invalidation or a concurrent segment table entry invalidation). Like the computer 100, this computer 200 can be implemented, for example, in a computer hardware environment such as that described in detail below and depicted in FIG. 12. Alternatively, the computer 200 could be implemented on any other computerized device or network of devices having the required storage and processing capability to perform the described processes (e.g., a laptop computer, a tablet computer, etc.).

The computer 200 can comprise at least one memory 210a-c and at least one processor 230.

For illustration purposes, three memories are shown. These memories can include, for example, a first memory 210a (also referred to herein as a main memory or a primary memory) and second memories 210b-c (also referred to herein as secondary memories). The second memories 210b-c can comprise, for example, any form of additional memory accessible by the processor 230. For example, the second memories 210b-c can comprise any of flash memories, optical discs, magnetic disks, magnetic tapes, etc. It should be understood that FIG. 2 is not intended to be limiting and that the computer 200 can, alternatively, comprise any number of one or more memories.

The at least one memory 210a-c can store (i.e., can be adapted to store, can be configured to store, etc.) information including, but not limited to, software 220 and data 225. The software 220 can comprise, for example, a hypervisor 221 (i.e., a host operating system that supports virtualization), at least one guest operating system 222, and any other software applications 224. The data 225 can comprise translation table(s) 229 (as discussed in greater detail below) and any other form of data. In the case of multiple memories, the software 220 and data 225 can be dispersed between the multiple memories. For example, the first memory 210a can store the hypervisor 221, one or more of the guest operating systems 222, and one or more other software applications 224. The second memories 210b-c can, for example, each store a guest operating system 222 and/or other software application(s) 224.

As mentioned above, the computer 200 can further comprise one or more processors 230 (e.g., central processing units (CPUs)). These processor(s) 230 can access (e.g., can be adapted to access, can be configured to access, etc.) the first memory 210a and, if applicable, any second memories 210b-c (e.g., over a system bus 201 or over any wired or wireless communication network (not shown)). For illustration purposes, three processors 230 are shown. However, it should be understood that FIG. 2 is not intended to be limiting and that the computer 200 can, alternatively, comprise any number of one or more processors 230.

At least one processor 230 can concurrently execute (i.e., can be adapted to concurrently execute, configured to concurrently execute, etc.) the hypervisor 221 and the guest operating system(s) 222 so as to allow for virtualization. It should be noted that storage, particularly, of the guest operating system(s) 222, in memory can be achieved using a combined segmentation and paging memory-management scheme. Those skilled in the art will recognize that with such a scheme, a guest operating system 222 can use a corresponding virtual memory and instructions for processes to be performed by that guest operating system 222 can appear to be stored in contiguous sections of the corresponding virtual memory. However, in actuality, the instructions can be divided into segments of logically related units (e.g., modules, procedures, etc.) and such segments can be pageable within the at least one memory 210a-c (i.e., pages of memory storing these segments can be dispersed across different areas within the at first memory 210a and, if applicable, any second memories 210b-c).

In order to implement this combined segmentation and paging memory-management scheme, the computer 200 can further comprise at least one segment table 227 and at least one page table 226. The segment table(s) 227 can be stored in memory (e.g., in the first memory 210a) and can associate effective addresses 247 with virtual addresses 242. That is, the segment table(s) 227 can map effective addresses 247 to virtual addresses 242. Similarly, the page table(s) 226 can be stored in memory (e.g., in the first memory 210a) and can associate virtual addresses 242 with physical addresses 243 in the first memory 210a and, if applicable, any second memories 210b-c. That is, the page table(s) 226 can map virtual addresses 242 to corresponding physical addresses 243 in the first memory 210a and, if applicable, in any second memories 210b-c.

Additionally, the computer 200 can further comprise at least one memory management unit 240 that is operably connected to the segment table(s) 227 and page table(s) 226 and that is in communication with the processor 230 (e.g. over the system bus 201). Those skilled in the art will recognize that, typically, computers that use combined segmentation and paging memory-management schemes comprise discrete memory management units associated with each processor. In any case, the memory management unit 240 can comprise translation logic 245 and look-aside buffers 249 (e.g., a segment look-aside buffer (SLB) 246 and a translation look-aside buffer (TLB) 241) used to enhance translation speed. Specifically, the SLB 246 and the TLB 241 can be implemented, for example, as content addressable memories (CAMs). The SLB 246 can have a fixed number of slots that contain segment table entries, which associate effective addresses 247 with virtual addresses 242. That is, the SLB 246 is a cache of the segment table(s) 227. Similarly, the TLB 241 can have a fixed number of slots that contain page table entries, which associate virtual addresses 242 with physical addresses 243. That is, the TLB 241 is a cache of the page table(s) 226. The translation logic 245 can control operations (i.e., can be adapted to control operations, can be configured to control operations, etc.) of the lookaside buffers 249 (i.e., the SLB 246 and TLB 241), segment table(s) 227, and page table(s) 226. These operation can include, but are not limited to, search operations, such as SLB search operations and segment table walk-throughs (also referred to herein as segment table searches), which are performed when a SLB search operation does not produce a hit, and TLB search operations and page table walk-throughs (also referred to herein as page table search operations), which are performed when a TLB search operation does not produce a hit; invalidate entry operations; modify entry operations; etc., performed, for example, in response to instructions received from the hypervisor 221 or a guest operating system 222.

The computer 200 can further comprise a flag management unit 250 that is in communication with the processor 230 and that is operably connected to at least one flagged address table 259 (e.g., over the system bus 201). The flagged address table(s) 259 can store (i.e., can be adapted to store, can be configured to store, etc.) a list of flagged effective addresses 257 and a list of flagged virtual addresses 252. It should be noted that the flagged address table(s) 259 can comprise a single flagged address table that stores both the flagged effective addresses 257 and the flagged virtual addresses 252 (not shown). Alternatively, the flagged address table(s) 259 can comprise multiple discrete flagged address tables, including a flagged effective address table 256 that stores a list of flagged effective addresses 257 and a flagged virtual address table 251 that stores a list of flagged virtual addresses 252. The flagged address table(s) 259 can be stored locally, for example, in register(s) within the flag management unit 250, as shown. Alternatively, the flagged address table(s) 259 can be stored in memory (e.g., in the first memory 210a). The flag management unit 250 can further comprise control logic 255 that controls operations (i.e., is adapted to control operations, is configured to control operations, etc.) of the flagged address table(s) 259 (e.g., of the flagged effective address table 256 and the flagged virtual address table 251). Such operations can include, but not limited to, set flag operations, compare address operations, and clear flag operations (as discussed in greater detail below).

When the processor 230 concurrently executes the hypervisor 221 and the guest operating system(s) 222, the hypervisor 221 can control execution (i.e., can be adapted to control execution, can be configured to control execution, can comprise a program of instructions that when executed by the processor 230 can control execution, etc.) of the guest operating system(s) 222 by the processor 230 in order to ensure that the guest operating system(s) 222 can function without disruption. For example, the hypervisor 221 or, more particularly, the processor 230 through execution of the hypervisor 221, can perform the following processes. The hypervisor 221 can receive, from a given guest operating system 222, a storage access instruction that requires a multi-stage translation of a first effective address into a physical address in the first memory 210a or, if applicable, in any of the second memories 210b-c.

Upon receiving such a storage access instruction, the hypervisor 221 can transmit, to the flag management unit 250 (e.g., over the system bus 201), a first set flag instruction, thereby causing the flag management unit 250 and, particularly, the control logic 255 thereof to add the first effective address to the list of flagged effective addresses 257 in the flagged address table(s) 259 (e.g., to the flagged effective address table 256). After transmitting the first set flag instruction, the hypervisor 221 can emulate the storage access instruction. That is, the hypervisor 221 can translate the first effective address into a first virtual address using the segment table(s) 227 by performing a segment table walk-through using the first effective address as a search key in order to search the segment table(s) 227 and acquire the first virtual address. Once the first virtual address is acquired, the hypervisor 221 can transmit a second set flag instruction to the flag management unit 250, thereby causing the flag management unit 250 and, particularly, the control logic 255 thereof to add the first virtual address to the flagged address table(s) 259 (e.g., to the flagged virtual address table 251). Additionally, the hypervisor 221 can translate the first virtual address into the physical address using the page table(s) 226 by performing a page table walk-through using the first virtual address as a search key in order to search the page table(s) 226 and acquire the physical address. Once the physical address is acquired, the hypervisor 221 can access the physical address in the appropriate memory 210a-c and complete the storage access instruction, as required, thereby completing the emulation process.

However, during the emulation process, in order to eliminate a race condition between the multi-stage translation operation performed by the hypervisor 221 and a concurrent translation invalidation by the hypervisor 221 or the given guest operating system 222 and, thereby prevent a translation error, the flag management unit 250 alone or, alternatively, the flag management unit 250 and another component of the computer 200 can take preventative action, if necessary. Specifically, as discussed in greater detail below, a flag, when set on either an effective address or a virtual address (i.e., when added to the flagged addresses in the flagged address table(s) 259), can trigger preventative action(s) if/when the hypervisor 221 or the given guest operating system 222 and, particularly, a thread of execution by the hypervisor 221 or the given guest operating system 222 attempts to invalidate a translation at issue (i.e., attempts to invalidate a segment table entry or page table entry required to complete the multi-stage translation).

More specifically, during the emulation process, the flag management unit 250 can receive (i.e., can be adapted to receive, can be configured to receive, etc.) an invalidate translation instruction (e.g., a segment look-aside buffer invalidate entry (SLBIE) instruction or a translation look-aside buffer invalidate entry (TLBIE) instruction), which is associated with a second address (e.g., either a second effective address or a second virtual address) and which was broadcast by either the hypervisor 221 or the given guest operating systems 222. Those skilled in the art will recognize that typically an operating system (e.g., the hypervisor 221 or the given guest operating system 222) can initiate invalidation of a segment table entry by first broadcasting a segment look-aside buffer invalidate entry (SLBIE) instruction. This is followed by invalidation, by the hypervisor 221 or the given guest operating system 222, of the corresponding segment table entry. Similarly, an operating system (e.g., the hypervisor 221 or the given guest operating system 222) can initiate invalidation of a page table entry by first broadcasting a translation look-aside buffer invalidate entry (TLBIE) instruction. This is followed by invalidation, by the hypervisor 221 or the given guest operating system 222, of the corresponding page table entry. Thus, detection by the flag management unit 250 of a SLBIE instruction can be an indication that a particular segment table entry associated with a second effective address is going to be invalidated or modified. Similarly, detection by the flag management unit 250 of a TLBIE instruction can be an indication that a particular page table entry associated with the second virtual address is going to be invalidated or modified.

Upon receipt of such an invalidate translation instruction, the flag management unit 250 and, particularly, the control logic 255 thereof can compare (i.e., can be adapted to compare, can be configured to compare, etc.) the second address to the flagged addresses stored in the flagged address table(s) 259. For example, if the second address comprises a second effective address, this second effective address can be compared to the flagged effective addresses 257 (including the first effective address) in a flagged effective address table 256. Alternatively, if the second address comprises a second virtual address, this second virtual address can be compared to the flagged virtual addresses 252 (including the first virtual address) in a flagged virtual address table 251. In any case, when a match is found (e.g., when a second effective address matches the first effective address stored in the flagged address table(s) 259 or when a second virtual address matches the first virtual address stored in the flagged address table(s) 259), the flag management unit 250 alone or, alternatively, the flag management unit 250 and another component of the computer 200 can take additional action to prevent an error in the multi-state translation.

For example, when a match is found (e.g., when a second effective address matches the first effective address stored in the flagged address table(s) 259 or when a second virtual address matches the first virtual address stored in the flagged address table(s) 259), the additional flag management unit 250 itself can take additional action to delay translation invalidation (i.e., invalidation of either a segment table entry or page table entry, as applicable) until the flags associated with the multi-stage translation are cleared.

Alternatively, when a match is found (e.g., when a second effective address matches the first effective address stored in the flagged address table(s) 259 or when a second virtual address matches the first virtual address stored in the flagged address table(s) 259), the flag management unit 250 can transmit (e.g., over the system bus 201) a conflict notification (i.e., can be adapted to transmit a conflict notification, can be configured to transmit a conflict notification, etc.) to that operating system (i.e., the hypervisor 221 or the given guest operating system 222), which originally broadcast the invalidate translation instruction (e.g., the SLBIE instruction or TLBIE instruction). In this case, the operating system (i.e., the hypervisor 221 or the given guest operating system 222), which originally broadcast the invalidate translation instruction and which received the conflict notification, can take further action (i.e., can be adapted to take further action, can be configured to take further action, etc.) in response to the conflict notification in order to prevent a translation error. Such action can include, for example, delaying translation invalidation (i.e., delaying invalidation of the segment table entry or page table entry at issue) until the flags associated with the multi-stage translation are cleared, repeatedly causing the invalidate translation instruction to restart until the flags associated with the multi-stage translation are cleared, and delaying an acknowledgement until the flags associated with the multi-stage translation are cleared.

It should be noted that, optionally, the operating system (i.e., the hypervisor 221 or the given guest operating system 222), which broadcast the invalidate translation instruction and which received the conflict notification, can recognize (i.e., can be adapted to ensure recognition of, can be configured to ensure recognition of, etc.) a perpetual conflict state. That is, this operating system can determine (i.e., can be adapted to determine, can be configured to determine, etc.) when the flag on the effective or virtual address at issue does not clear (i.e., when the address is not removed from the flagged address table(s) 259) either after a predetermined period of time or after a predetermined number of times restarting the invalidate translation instruction. When the operating system, which broadcast the invalidate translation instruction and which received the conflict notification, is the hypervisor 221, the hypervisor 221 can take additional action (i.e., can be adapted to take additional action, can be configured to take additional action, etc.) to overcome the perpetual conflict state. Such action can include, for example, delaying the emulation process until the invalidate translation process is performed or, if necessary, restarting the emulation process after the invalidate translation process is performed. When the operating system, which broadcast the invalidate translation instruction and which received the conflict notification, is the given guest operating system 222, this given guest operating system 222 can transmit (i.e., can be adapted to transmit, can be configured to transmit, etc.) a forward progress interrupt to the hypervisor 221 and the hypervisor 221 can, in response to the forward progress interrupt, take additional action (i.e., can be adapted to take additional action, can be configured to take additional action, etc.) to overcome the perpetual conflict state. Again, such additional action can include, for example, delaying the emulation process until the invalidate translation process is performed or, if necessary, restarting the emulation process after the invalidate translation process is performed.

Alternatively, regardless of which operating system broadcast the invalidate translation instruction, when a match is found, the flag management unit 250 can transmit (e.g., over the system bus 201) a conflict notification (i.e., can be adapted to transmit a conflict notification, can be configured to transmit a conflict notification, etc.) to the hypervisor 221. In this case, the hypervisor 221 can take further action (i.e., can be adapted to take further action, can be configured to take further action, etc.) in response to the conflict notification in order to prevent a translation error. Such action can include, for example, delaying the emulating process and, particularly, the translation stage at issue when it has yet to occur (e.g., delaying translation of the first effective address to the first virtual address when the translation invalidation pertains to a segment table entry or delaying translation of the first virtual address to the physical address when the translation invalidation pertains to a page table entry) or repeating the emulating process when the multi-stage translation has already occurred.

In any case, once the hypervisor 221 has completed the emulation process it can transmit a clear flags instruction to the flag management unit 250, thereby causing the flag management unit 250 and, particularly, the control logic 255 thereof to clear the first effective address and the first virtual address from the flagged address table(s) 259 (e.g., from the flagged effective address table 256 and the flagged virtual address table 251, respectively).

Also disclosed herein is a method for operating a computer configured for hypervisor-controlled virtualization and for eliminating a race condition between a hypervisor-performed emulation process requiring a translation operation using one or more page tables and a concurrent page table entry invalidation. This method can be implemented using the computer 100 described in detail above and illustrated in FIG. 1.

Figure 3:
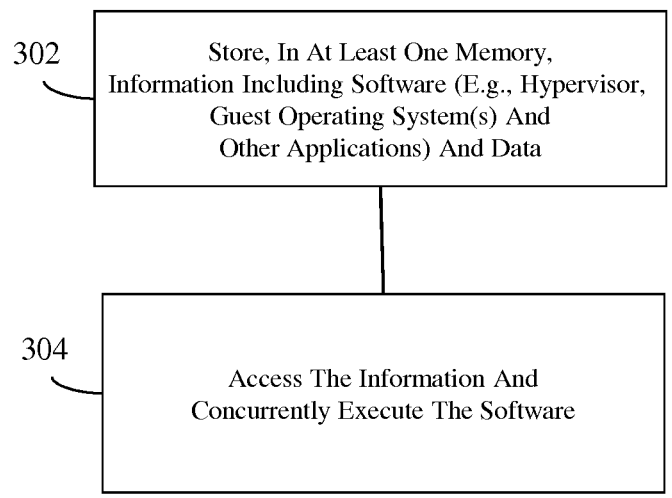
FIG. 3 is a flow diagram illustrating a method for operating the computer of FIG. 1 or FIG. 2.

Referring to flow diagram of FIG. 3 in combination with the computer 100 diagram of FIG. 1, the method disclosed herein can comprise storing, in at least one memory 110a-c accessible by one or more processor(s) 130 (e.g., central processing units (CPUs)) of the computer 100, information including, but not limited to, software 120 and data 125 (302). As discussed in detail above, for illustration purposes, three memories are shown including, for example, a first memory 110a (also referred to herein as a main memory or a primary memory) and second memories 110b-c (also referred to herein as secondary memories). The second memories 110b-c can comprise, for example, any form of additional memory accessible by a processor 130. For example, the second memories 110b-c can comprise any of flash memories, optical discs, magnetic disks, magnetic tapes, etc. It should be understood that FIG. 1 is not intended to be limiting and that the computer 100 can, alternatively, comprise any number of one or more memories. The software 120 can comprise, for example, a hypervisor 121 (i.e., a host operating system that supports virtualization), at least one guest operating system 122, and any other software applications 124. The data 125 can comprise table(s) 126 (as discussed in greater detail below) and any other form of data. In the case of multiple memories, the software 120 and data 125 can be dispersed between the multiple memories. For example, the first memory 110a can store the hypervisor 121, one or more of the guest operating systems 122, and one or more other software applications 124. The second memories 110b-c can, for example, each store a guest operating system 122 and/or another software application 124.

The method can further comprise accessing and concurrently executing, by a processor 130, the software 120, including the hypervisor 121 and the guest operating system(s) 122, so as to allow for virtualization (304). It should be noted that storage, particularly, of the guest operating system(s) 122, in the at least one memory 110a-c can be achieved using a paging memory-management scheme. Those skilled in the art will recognize that with such a scheme, a guest operating system 122 can use a corresponding virtual memory and instructions for processes to be performed by that guest operating system 122 can appear to be stored in contiguous sections of the corresponding virtual memory. However, in actuality, pages (i.e., blocks) of memory storing those instructions can be dispersed across different areas within the first memory 110a and, if applicable, any second memories 110b-c.

Figure 4:
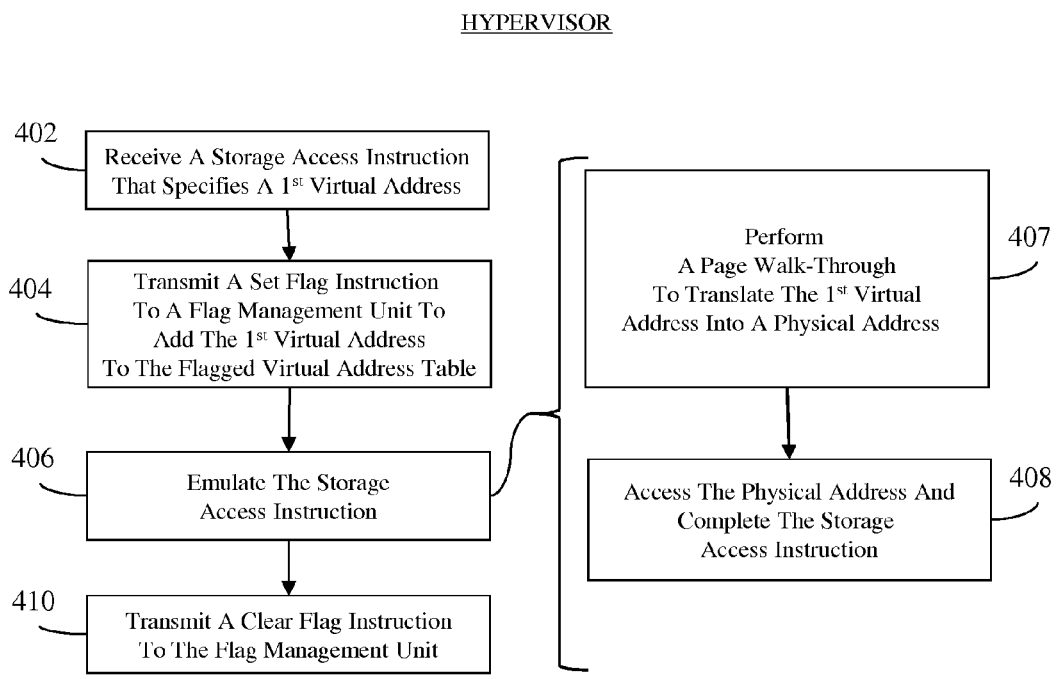
FIG. 4 is a flow diagram detailing process 304 of the flow diagram of FIG. 3 during operation of the computer of FIG. 1.

Referring to the flow diagram of FIG. 4 in combination with FIG. 1, when the hypervisor 121 and the guest operating system(s) 122 are concurrently executed at process 304, the following processes can be performed in order control execution of the guest operating system(s) 122 and, thereby ensure that the guest operating system(s) 122 can function without disruption. Specifically, the method can further comprise receiving, by the hypervisor 121 from a given guest operating system 122, a storage access instruction, which requires translation of a first virtual address into a physical address in the first memory 110a or, if applicable, in any of the second memories 110b-c (402). Upon receipt of the storage access instruction, a set flag instruction can be transmitted, by the hypervisor 121 to a flag management unit 150, thereby causing the flag management unit 150 and, particularly, control logic 155 thereof to add the first virtual address to a flagged virtual address table 151 that stores a list of flagged virtual addresses 152 (404). Then, the storage access instruction can be emulated by the hypervisor 121 (406).

The process 406 of emulating the storage access instruction can comprise translating the first virtual address into the physical address using at least one page table 126, which associates virtual addresses with physical addresses in the at least one memory 110a-c (407). Specifically, the hypervisor 121 can perform a page table walk-through (i.e., a page table search) using the first virtual address as a search key in order to search the page table(s) 126 and acquire the physical address (407). This physical address can then be accessed by hypervisor 121 and the storage access instruction can be completed, thereby completing the emulation process (408).

However, during the emulation process 406, in order to eliminate a race condition between the translation operation performed by the hypervisor 121 and a concurrent translation invalidation by the hypervisor 121 or the given guest operating system 122 and, thereby to prevent a translation error, preventative action can be taken, if necessary (e.g., by the flag management unit 150 alone or, alternatively, by the flag management unit 150 and another component of the computer 100). Specifically, as discussed in greater detail below, a flag, when set (i.e., when the virtual address is added to the list of flagged virtual addresses 152 in the flagged virtual address table 151), can trigger preventative action(s) if/when the hypervisor 121 or the given guest operating system 122 and, particularly, a thread of execution by the hypervisor 121 or the given guest operating system 122 attempts to invalidate a translation at issue and, particularly, to invalidate a page table entry, which is required for performance of the translation.

More specifically, during the emulation process 406, an invalidate translation instruction (e.g., a translation look-aside buffer invalidate entry (TLBIE) instruction), which is associated with a second virtual address and which was broadcast (e.g., over the system bus 101) by either the hypervisor 121 or the given guest operating system 122, can be received by the flag management unit 150. Those skilled in the art will recognize that typically an operating system (e.g., the hypervisor 121 or the given guest operating system 122) can initiate invalidation of a page table entry by first broadcasting a translation look-aside buffer invalidate entry (TLBIE) instruction. This is followed by invalidation, by the hypervisor 121 or the given guest operating system 122, of the corresponding page table entry. Thus, detection by the flag management unit 150 of a TLBIE instruction can be an indication that a particular page table entry associated with the second virtual address is going to be invalidated or modified.

Upon receipt of such an invalidate translation instruction, the second virtual address can be compared (e.g., by the flag management unit 150 and, particularly, by the control logic 155 thereof) to the flagged virtual addresses 152 (including the first virtual address) stored in the flagged virtual address table 151. When a match is found (i.e., when the second virtual address matches the first virtual address stored in the flagged virtual address table 151), additional action can be taken (e.g., by the flag management unit alone 150 or by the flag management unit 150 and another component of the computer 100) to prevent an error in the translation.

Figure 5:
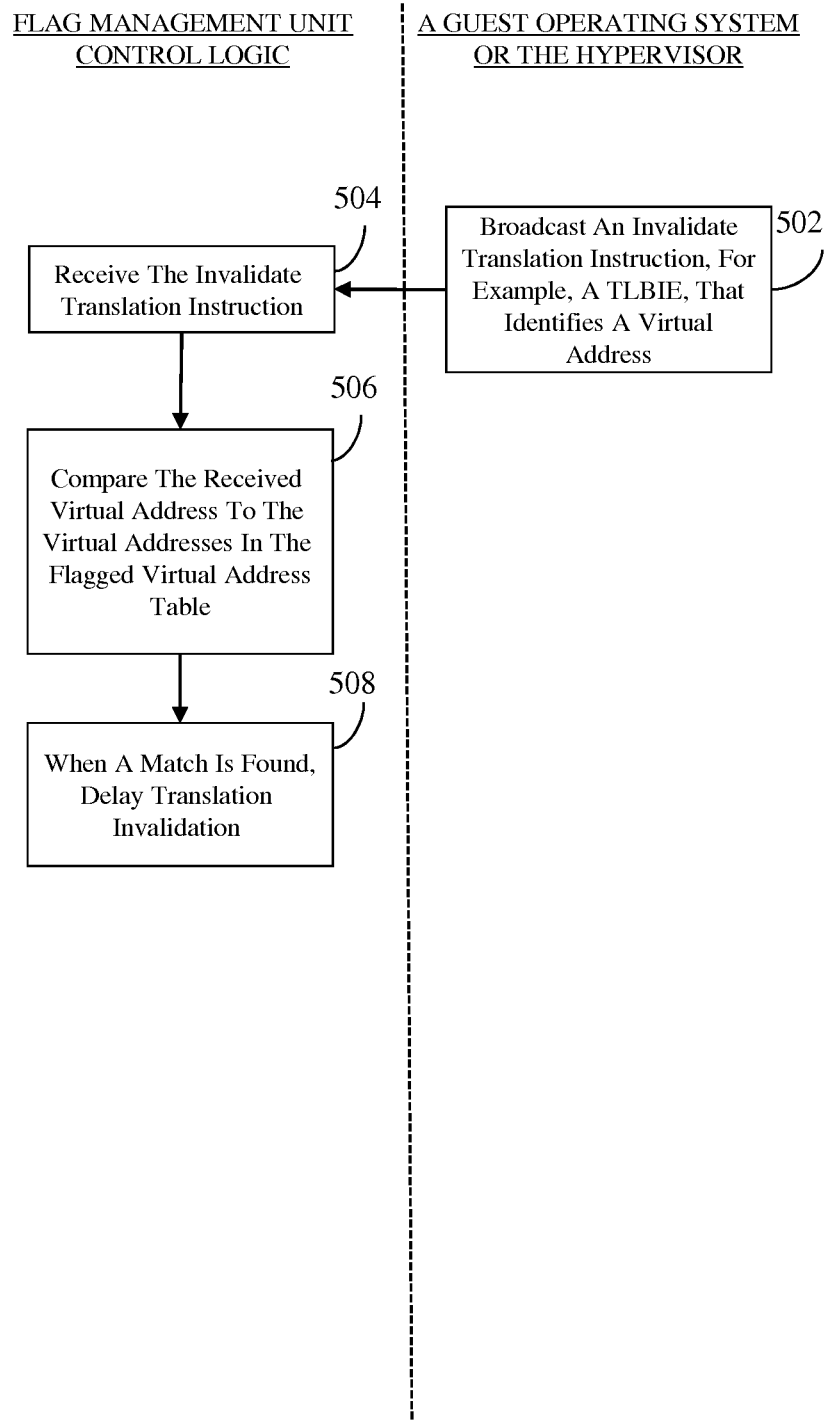
FIG. 5 is a flow diagram detailing additional processes that can be performed during process 406 of FIG. 4 in order to eliminate a race condition between a translation operation performed by a hypervisor and a concurrent translation invalidation by the hypervisor or a given guest operating system.

For example, referring to FIG. 5 in combination with FIG. 1, an invalidate translation instruction (e.g., a translation look-aside buffer invalidate entry (TLBIE)) can be broadcast by the hypervisor 121 or the given guest operating system 122 and received by the flag management unit 150 and, particularly, the control logic 155 thereof (502)-(504). A virtual address specified in the invalidate translation instruction can be compared (e.g., by the control logic 155) to the flagged virtual addresses 152 in the flagged virtual address table 151 and, when a match is found (i.e., when the second virtual address matches the first virtual address stored in the flagged virtual address table 151), additional action can be taken by the flag management unit 150 itself to delay translation invalidation until the flag is cleared (i.e., until the first virtual address is removed from the flagged virtual address table 151) (506)-(508).

Figure 6:
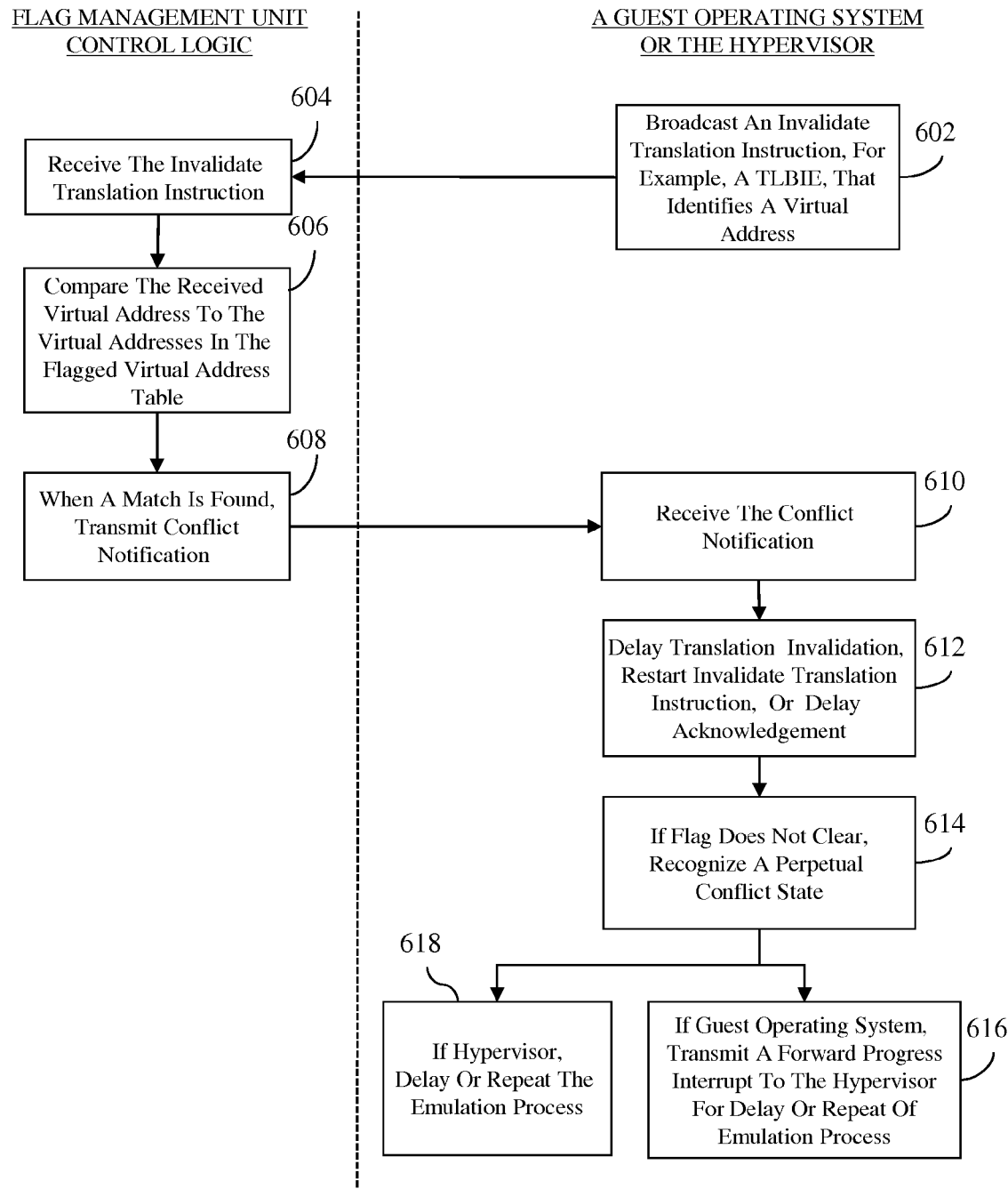
FIG. 6 is a flow diagram detailing alternative additional processes that can be performed during process 406 of FIG. 4 in order to eliminate a race condition between a translation operation performed by a hypervisor and a concurrent translation invalidation by the hypervisor or a given guest operating system.

Alternatively, referring to FIG. 6 in combination with FIG. 1, an invalidate translation instruction (e.g., a translation look-aside buffer invalidate entry (TLBIE)) can be broadcast by the hypervisor 121 or the given guest operating system 122 and received by the flag management unit 150 and, particularly, the control logic 155 thereof (602)-(604). A virtual address specified in the invalidate translation instruction can be compared (e.g., by the control logic 155) to the flagged virtual addresses 152 in the flagged virtual address table 151 and, when a match is found (i.e., when the second virtual address matches the first virtual address stored in the flagged virtual address table 151), a conflict notification can be transmitted (e.g., by the flag management unit 150 over the system bus 101) back to the operating system (i.e., the hypervisor 121 or the given guest operating system 122), which originally broadcast the invalidate translation instruction (e.g., the TLBIE instruction) (608). In this case, that operating system (i.e., the hypervisor 121 or the given guest operating system 122), which originally broadcast the invalidate translation instruction and which received the conflict notification, can take further action in response to the conflict notification in order to prevent a translation error (610)-(612). Such action at process 612 can include, for example, delaying translation invalidation (i.e., delaying invalidation of the page table entry) until the flag is cleared, repeatedly causing the invalidate translation instruction to restart until the flag is cleared, and delaying an acknowledgement until the flag is cleared.

It should be noted that, optionally, the operating system (i.e., the hypervisor 121 or the given guest operating system 122), which broadcast the invalidate translation instruction at process 602 and which received a conflict notification at process 610, can recognize a perpetual conflict state (614). That is, this operating system can determine when the flag does not clear (i.e., when the virtual address is not removed from the list of flagged virtual addresses 152 in the flagged virtual address table 151) either after a predetermined period of time or after a predetermined number of times restarting the invalidate translation instruction. When the operating system, which broadcast the invalidate translation instruction and which received the conflict notification, is the hypervisor 121, the hypervisor 121 can take additional action (i.e., can be adapted to take additional action, can be configured to take additional action, etc.) to overcome this perpetual conflict state (618). Such additional action can include, for example, delaying the emulation process until the invalidate translation process is performed or, if necessary, restarting the emulation process after the invalidate translation process is performed. When the operating system, which broadcast the invalidate translation instruction and which received the conflict notification, is the given guest operating system 122, this given guest operating system 122 can transmit (i.e., can be adapted to transmit, can be configured to transmit, etc.) a forward progress interrupt to the hypervisor 121 and the hypervisor 121 can, in response to the forward progress interrupt, take additional action (i.e., can be adapted to take additional action, can be configured to take additional action, etc.) to overcome the perpetual conflict state (616). Again, such additional action can include, for example, delaying the emulation process until the invalidate translation process is performed or, if necessary, restarting the emulation process after the invalidate translation process is performed.

Figure 7:
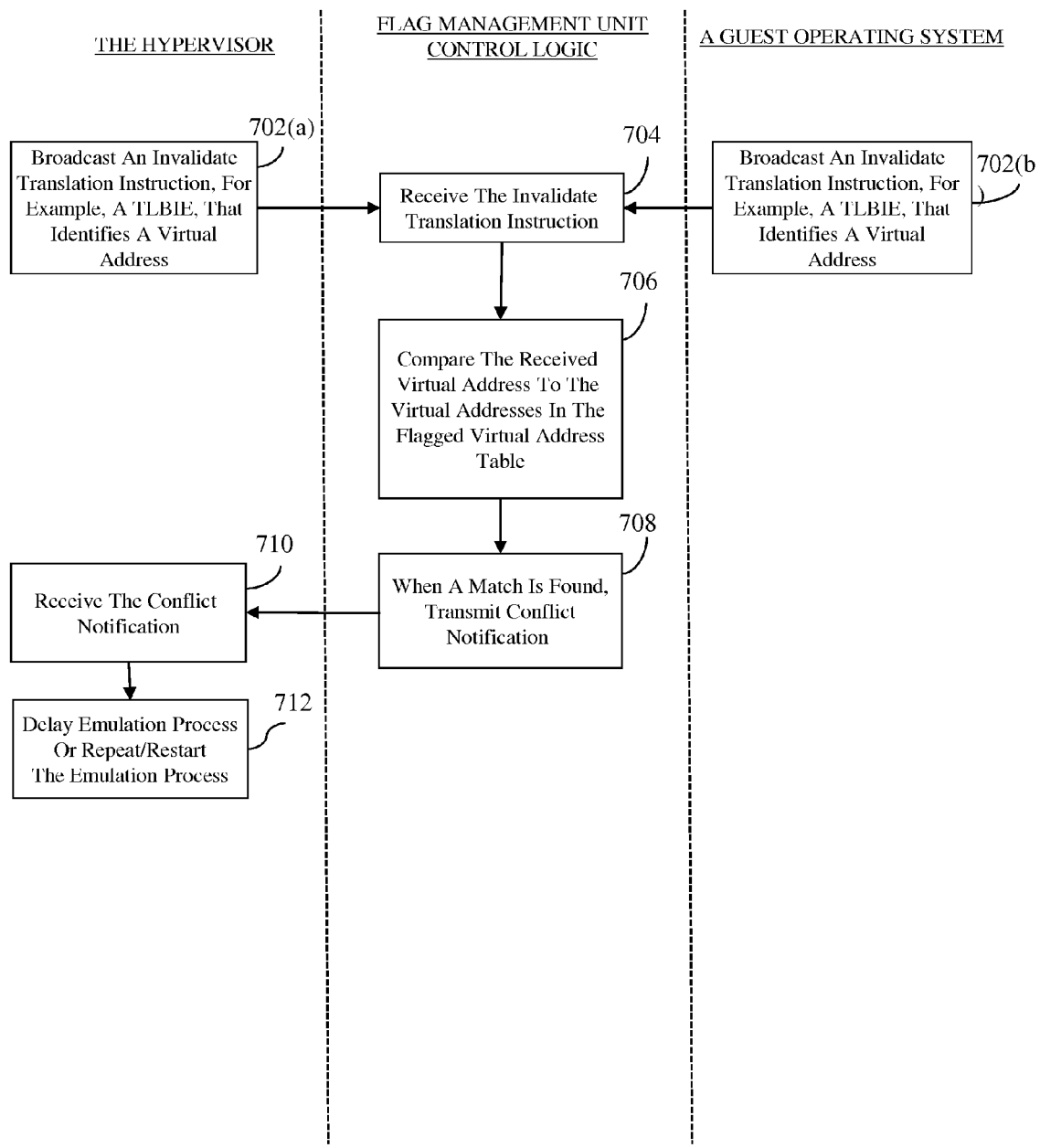
FIG. 7 is a flow diagram detailing alternative additional processes that can be performed during process 406 of FIG. 4 in order to eliminate a race condition between a translation operation performed by a hypervisor and a concurrent translation invalidation by the hypervisor or a given guest operating system.

Alternatively, referring to FIG. 7 in combination with FIG. 1, an invalidate translation instruction (e.g., a translation look-aside buffer invalidate entry (TLBIE)) can be broadcast by the hypervisor 121 (702(a)) or the given guest operating system 122 (702(b)) and received by the flag management unit 150 and, particularly, the control logic 155 thereof (704). A virtual address specified in the invalidate translation instruction can be compared (e.g., by the control logic 155) to the flagged virtual addresses 152 in the flagged virtual address table 151 and, when a match is found (i.e., when the second virtual address matches the first virtual address stored in the flagged virtual address table 151), a conflict notification can be transmitted (e.g., by the flag management unit 150 over the system bus 101) to the hypervisor 121 regardless of which operating system broadcast the TLBIE (706)-(708). This conflict notification can be received by the hypervisor 121, which can, in response to the conflict notification, take preventative action in order to prevent a translation error (710)-(712). Such preventative action can include, for example, delaying the emulating process, when translation has yet to be performed, or repeating the emulating process, when the translation has already occurred.

In any case, referring again to the flow diagram of FIG. 4, once the emulation process 406 has been completed, a clear flag instruction can be transmitted by the hypervisor 121 to the flag management unit 150, thereby causing the flag management unit 150 and, particularly, the control logic 155 thereof to clear the first virtual address from the flagged virtual address table 151 (410).

In the method described above is emulation of a storage access instruction requires only a single-stage translation from a virtual address to a physical address using a single type of translation table and, particularly, page table(s). However, those skilled in the art will recognize that oftentimes emulation of a storage access instruction requires a multi-stage translation from, for example, an effective address to a virtual address to a physical address and such a multi-step translation may require multiple different types of translation tables, for example, segment table(s) and page table(s). Thus, it should be understood that the mechanism disclosed herein to avoid a race condition and, thereby eliminate translation errors can also be employed when such multi-stage translations are required.

Thus, also disclosed herein is another method for operating a computer that is configured for hypervisor-controlled virtualization and for eliminating a race condition between a hypervisor-performed emulation process requiring a multi-stage translation operation using different types of translation tables (e.g., one or more segment tables as well as one or more page tables) and a concurrent translation table entry invalidation. Referring again to the flow diagram of FIG. 3 and, particularly, in combination with the computer 200 diagram of FIG. 2, this method can comprise storing, in at least one memory 210*a-c* accessible by at least one processor 230 (e.g., central processing units (CPUs)) of a computer 200, information including, but not limited to, software 220 and data 225 (302).

As discussed in detail above, for illustration purposes, three memories are shown. These memories can include, for example, a first memory 210*a* (also referred to herein as a main memory or a primary memory) and second memories 210*b-c* (also referred to herein as secondary memories). The second memories 210*b-c* can comprise, for example, any form of additional memory accessible by the processor 230. For example, the second memories 210*b-c* can comprise any of flash memories, optical discs, magnetic disks, magnetic tapes, etc. It should be understood that FIG. 2 is not intended to be limiting and that the computer 200 can, alternatively, comprise any number of one or more memories. The software 220 can comprise, for example, a hypervisor 221 (i.e., a host operating system that supports virtualization), at least one guest operating system 222, and any other software applications 224. The data 225 can comprise translation table(s) 229 (as discussed in greater detail below) and any other form of data. In the case of multiple memories, the software 220 and data 225 can be dispersed between the multiple memories. For example, the first memory 210*a* can store the hypervisor 221, one or more of the guest operating systems 222, and one or more other software applications 224. The second memories 210*b-c* can, for example, each store a guest operating system 222 and/or another software application 224.

The method can further comprise accessing and concurrently executing, by a processor 230, the software 220, including the hypervisor 221 and the guest operating system(s) 222 so as to allow for virtualization (304). It should be noted that storage, particularly, of the guest operating system(s) 222, in the at least one memory 210*a-c* can be achieved using a combined segmentation and paging memory-management scheme. Those skilled in the art will recognize that with such a scheme, a guest operating system 222 can use a corresponding virtual memory and instructions for processes to be performed by that guest operating system 222 can appear to be stored in contiguous sections of the corresponding virtual memory. However, in actuality, the instructions can be divided into segments of logically related units (e.g., modules, procedures, etc.) and such segments can be pageable within the at least one memory 210*a-c* (i.e., pages of memory storing these segments can be dispersed across different areas within the at least one memory 210*a-c*).

Figure 8:
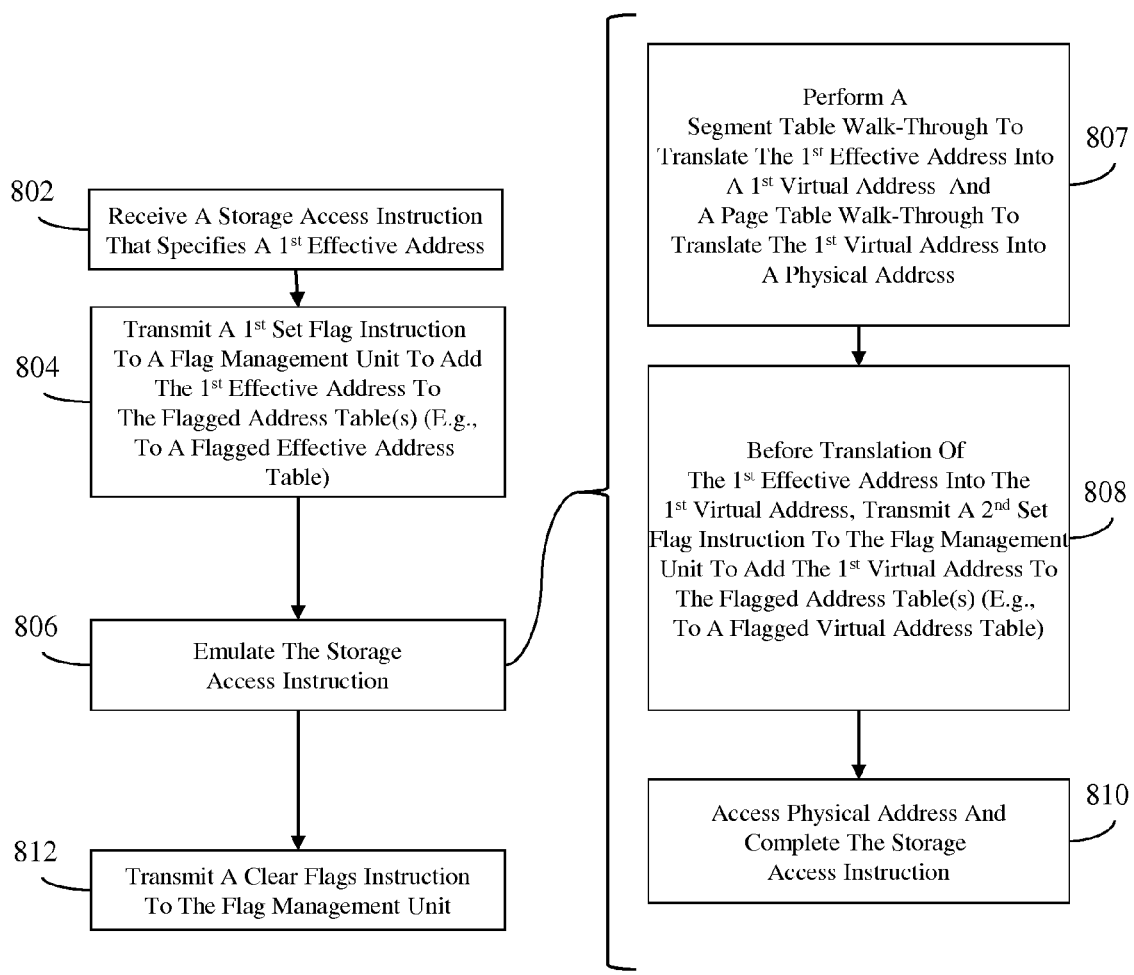
FIG. 8 is a flow diagram detailing process 304 of the flow diagram of FIG. 3 during operation of the computer of FIG. 2.

Referring to the flow diagram of FIG. 8 in combination with FIG. 2, when the hypervisor 221 and the guest operating system(s) 222 are concurrently executed at process 304, the following processes can be performed in order control execution of the guest operating system(s) 222 and, thereby ensure that the guest operating system(s) 222 can function without disruption. Specifically, the method can further comprise receiving, by the hypervisor 221 from a given guest operating system 222, a storage access instruction, which requires translation of a first effective address into a physical address in the at least one memory 210*a-c* (802). Upon receipt of the storage access instruction, a first set flag instruction can be transmitted, by the hypervisor 221 to a flag management unit 250, thereby causing the flag management unit 250 and, particularly, control logic 255 thereof to add the first effective address to a flagged address table 259 (804). Specifically, the first effective address can be added at process 804 to a single flagged address table that stores lists of both flagged effective addresses 257 and flagged virtual addresses 252 (not shown). Alternatively, the first effective address can be added at process 804 to one of multiple flagged address tables 259 and, particularly, to a flagged effective address table 256 that stores a list of flagged effective addresses 257. Then, the storage access instruction can be emulated by the hypervisor 221 (806).

The process 806 of emulating the storage access instruction can translating the first effective address into a first virtual address using at least one segment table 227, which is stored in memory and which associates effective addresses 247 with virtual addresses 242. Specifically, a segment table walk-through of one or more segment table(s) 227, which associate effective addresses 247 with virtual addresses 242, can be performed by the hypervisor 221 using the first effective address as a search key in order to search the segment table(s) 227 and acquire a first virtual address (807). After translating the first effective address into a first virtual address, a page table walk-through of one or more page table(s) 226, which are stored in memory and which associate virtual addresses 242 with physical addresses 243 in the at least one memory 210*a-c*, can be performed by the hypervisor 221 using the first virtual address as a search key in order to search the page table(s) 226 and acquire the physical address (807). However, before translation of the first virtual address into the physical address (i.e., after the first virtual address is acquired and before the physical address is acquired), a second set flag instruction can be transmitted by the hypervisor 221 to the flag management unit 250, thereby causing the flag management unit 250 and, particularly, the control logic 255 thereof to add the first virtual address to a flagged address table 259 (808). Specifically, the first virtual address can be added to a single flagged address table that stores lists of both flagged effective addresses 257 and the flagged virtual addresses 252 (not shown). Alternatively, the first virtual address can be added at process 808 to one of multiple flagged address tables 259 and, particularly, to a flagged virtual address table 251 that stores a list of flagged virtual addresses 252. In any case, after the physical address is acquired it can be accessed by the hypervisor 221 and the storage access instruction can be completed, thereby completing the emulation process (810).

However, during the emulation process 806, in order to eliminate a race condition between the multi-stage translation operation performed by the hypervisor 221 and a concurrent translation invalidation by the hypervisor 221 or the given guest operating system 222 and, thereby prevent a translation error, preventative action can be taken, if necessary, by the flag management unit 250 alone or, alternatively, by the flag management unit 250 and another component of the computer 200. Specifically, as discussed in greater detail below, flags, when set (i.e., when addresses are added to the flagged address table(s) 259)), can trigger preventative action(s) if/when the hypervisor 221 or the given guest operating system 222 and, particularly, a thread of execution by the hypervisor 221 or the given guest operating system 222 attempts to invalidate a translation at issue and, particularly, to invalidate a translation table entry required for performance of the multi-stage translation. This translation table entry can be, for example, a segment table entry, which can be invalidated through the use of a segment look-aside buffer invalidate entry (SLBIE) instruction, or a page table entry, which can be invalidated through the use of a translation look-aside buffer invalidate entry (TLBIE) instruction.

Specifically, during the emulation process 806, an invalidate translation instruction (e.g., a segment look-aside buffer invalidate entry (SLBIE) instruction or a translation look-aside buffer invalidate entry (TLBIE) instruction), which is associated with a second address (e.g., either a second effective address or a second virtual address, respectively) and which was broadcast by either the hypervisor 221 or the given guest operating systems 222, can be received by the flag management unit 250. Those skilled in the art will recognize that typically an operating system (e.g., the hypervisor 221 or the given guest operating system 222) can initiate invalidation of a segment table entry by first broadcasting a segment look-aside buffer invalidate entry (SLBIE) instruction. This is followed by invalidation, by the hypervisor 221 or the given guest operating system 222, of the corresponding segment table entry. Similarly, an operating system (e.g., the hypervisor 221 or the given guest operating system 222) can initiate invalidation of a page table entry by first broadcasting a translation look-aside buffer invalidate entry (TLBIE) instruction. This is followed by invalidation, by the hypervisor 221 or guest operating system 222, of the corresponding page table entry. Thus, detection by the flag management unit 250 of a SLBIE instruction can be an indication that a particular segment table entry associated with a second effective address is going to be invalidated or modified. Similarly, detection by the flag management unit 250 of a TLBIE instruction can be an indication that a particular page table entry associated with the second virtual address is going to be invalidated or modified.

Upon receipt of such an invalidate translation instruction, the second address can be compared by the flag management unit 250 and, particularly, by the control logic 255 thereof to the lists of flagged addresses 252, 257 stored in the flagged address table(s) 259. For example, if the second address comprises a second effective address, this second effective address can be compared to the list of flagged effective addresses 257 (including the first effective address) in a flagged effective address table 256. If the second address comprises a second virtual address, this second virtual address can be compared to the list of flagged virtual addresses 252 (including the first virtual address) in a flagged virtual address table 251. In any case, when a match is found (e.g., when a second effective address matches the first effective address stored in the flagged address table(s) 259 or when a second virtual address matches the first virtual address stored in the flagged address table(s) 259), additional action can be taken by the flag management unit 250 alone or, alternatively, by the flag management unit 250 and another component of the computer 200 to prevent an error in the multi-state translation.

Figure 9:
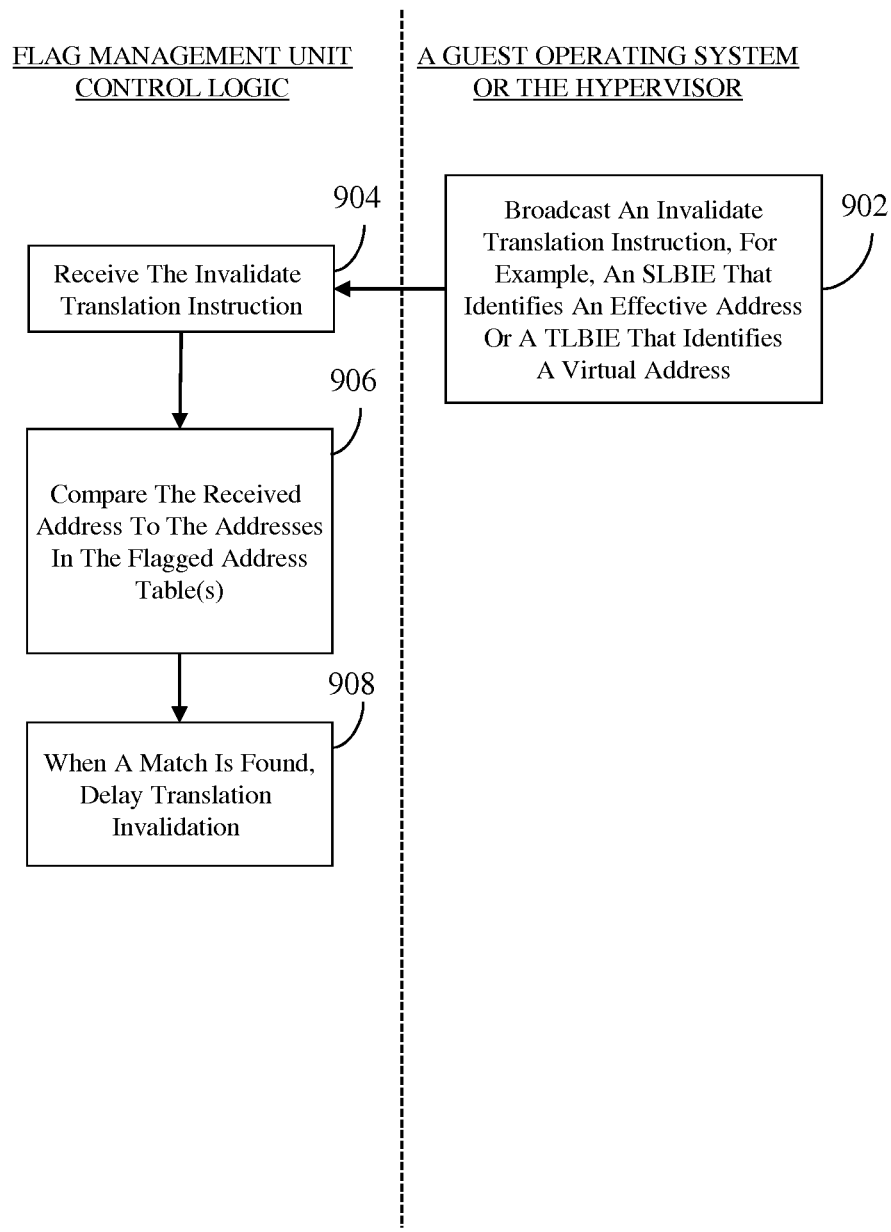
FIG. 9 is a flow diagram detailing additional processes that can be performed during process 806 of FIG. 8 in order to eliminate a race condition between a translation operation performed by a hypervisor and a concurrent translation invalidation by the hypervisor or a given guest operating system.

For example, referring to FIG. 9 in combination with FIG. 2, an invalidate translation instruction (e.g., a segment look-aside buffer invalidate entry (SLBIE) instruction or a translation look-aside buffer invalidate entry (TLBIE)) can be broadcast by the hypervisor 221 or the given guest operating system 222 and received by the flag management unit 250 and, particularly, the control logic 255 thereof (902)-(904). An address specified in the invalidate translation instruction can be compared (e.g., by the control logic 255) to the addresses in the flagged address table(s) 259 (906). For example, a second effective address specified in a SLBIE instruction can be compared to the flagged effective addresses 257 in a flagged effective address table 256 or a second virtual address specified in a TLBIE instruction can be compared to the flagged virtual addresses 252 specified in a flagged virtual address table 251, as applicable. When a match is found (i.e., when a second effective address matches the first effective address stored in the flagged effective address table 256 or when the second virtual address matches the first virtual address stored in the flagged virtual address table 251), additional action can be taken by the flag management unit 250 itself to delay translation invalidation (i.e., to delay invalidation of the segment table entry or page table entry, as applicable) until any flags associated with the multi-stage translation are cleared (i.e., until the first effective address and second effective address are removed from the flagged address table(s) 259) (908).

Figure 10:
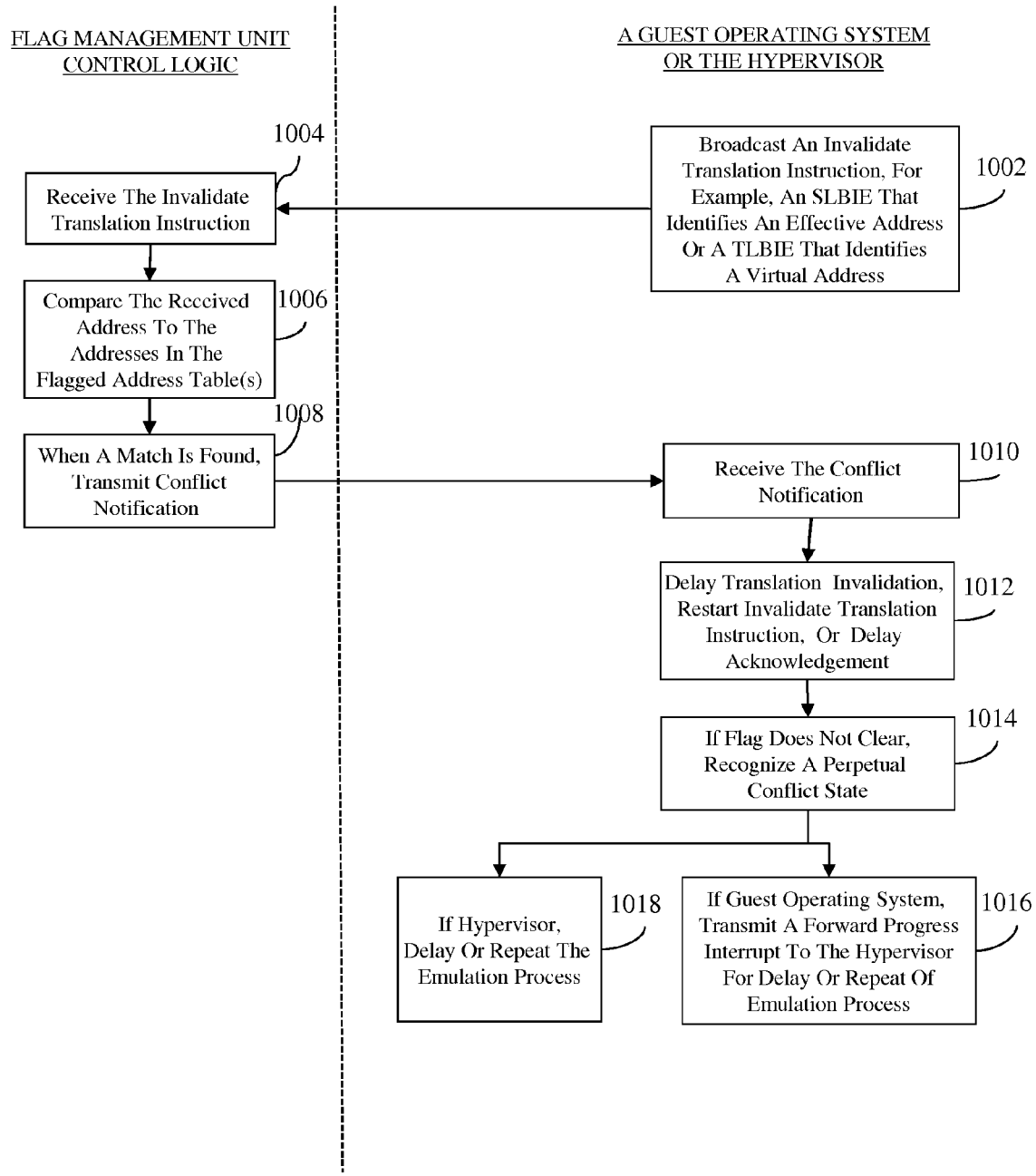
FIG. 10 is a flow diagram detailing alternative additional processes that can be performed during process 806 of FIG. 8 in order to eliminate a race condition between a translation operation performed by a hypervisor and a concurrent translation invalidation by the hypervisor or a given guest operating system.

Alternatively, referring to FIG. 10 in combination with FIG. 2, an invalidate translation instruction (e.g., a segment look-aside buffer invalidate entry (SLBIE) instruction or a translation look-aside buffer invalidate entry (TLBIE)) can be broadcast by the hypervisor 221 or the given guest operating system 222 and received by the flag management unit 250 and, particularly, the control logic 255 thereof (1002)-(1004). An address specified in the invalidate translation instruction can be compared (e.g., by the control logic 255) to the flagged addresses in the flagged address table(s) 259 (1006). For example, a second effective address specified in a SLBIE instruction can be compared to the flagged effective addresses 257 in a flagged effective address table 256 or a second virtual address specified in a TLBIE instruction can be compared to the flagged virtual addresses 252 specified in a flagged virtual address table 251 (1006). When a match is found (i.e., when a second effective address matches the first effective address stored in the flagged effective address table 256 or when the second virtual address matches the first virtual address stored in the flagged virtual address table 251), a conflict notification can be transmitted (e.g., by the flag management unit 250 over the system bus 201) to that operating system (i.e., the hypervisor 221 or the given guest operating system 222), which originally broadcast the invalidate translation instruction (e.g., the SLBIE instruction or the TLBIE instruction) (1008). In this case, that operating system (i.e., the hypervisor 221 or the given guest operating system 222), which originally broadcast the invalidate translation instruction and which received the conflict notification, can take further action in response to the conflict notification in order to prevent a translation error (1010)-(1012). Such action at process 1012 can include, for example, delaying translation invalidation (i.e., delaying invalidation of the segment table entry or page table entry) until any flags associated with the multi-stage translation are cleared, repeatedly causing the invalidate translation instruction to restart until any flags associated with the multi-stage translation are cleared, and delaying an acknowledgement until any flags associated with the multi-stage translation are cleared.

It should be noted that, optionally, the operating system (e.g., the hypervisor 221 or the given guest operating system 222), which broadcast the invalidate translation instruction at process 1002 and which, in response, received a conflict notification at process 1010, can recognize a perpetual conflict state (1014). That is, this operating system can determine when a flag does not clear (i.e., when the flagged address is not removed from the flagged address table(s) 259) either after a predetermined period of time or after a predetermined number of times restarting the invalidate translation instruction. When the operating system, which broadcast the invalidate translation instruction and which received the conflict notification, is the hypervisor 221, the hypervisor 221 can take additional action (i.e., can be adapted to take additional action, can be configured to take additional action, etc.) to overcome this perpetual conflict state (1018). Such additional action can include, for example, delaying the emulation process until the invalidate translation process is performed or, if necessary, restarting the emulation process after the invalidate translation process is performed. When the operating system, which broadcast the invalidate translation instruction and which received the conflict notification, is the given guest operating system 222, this given guest operating system 222 can transmit (i.e., can be adapted to transmit, can be configured to transmit, etc.) a forward progress interrupt to the hypervisor 221 and the hypervisor 221 can, in response to the forward progress interrupt, take additional action (i.e., can be adapted to take additional action, can be configured to take additional action, etc.) to overcome the perpetual conflict state (1016). Again, such additional action can include, for example, delaying the emulation process until the invalidate translation process is performed or, if necessary, restarting the emulation process after the invalidate translation process is performed.

Figure 11:
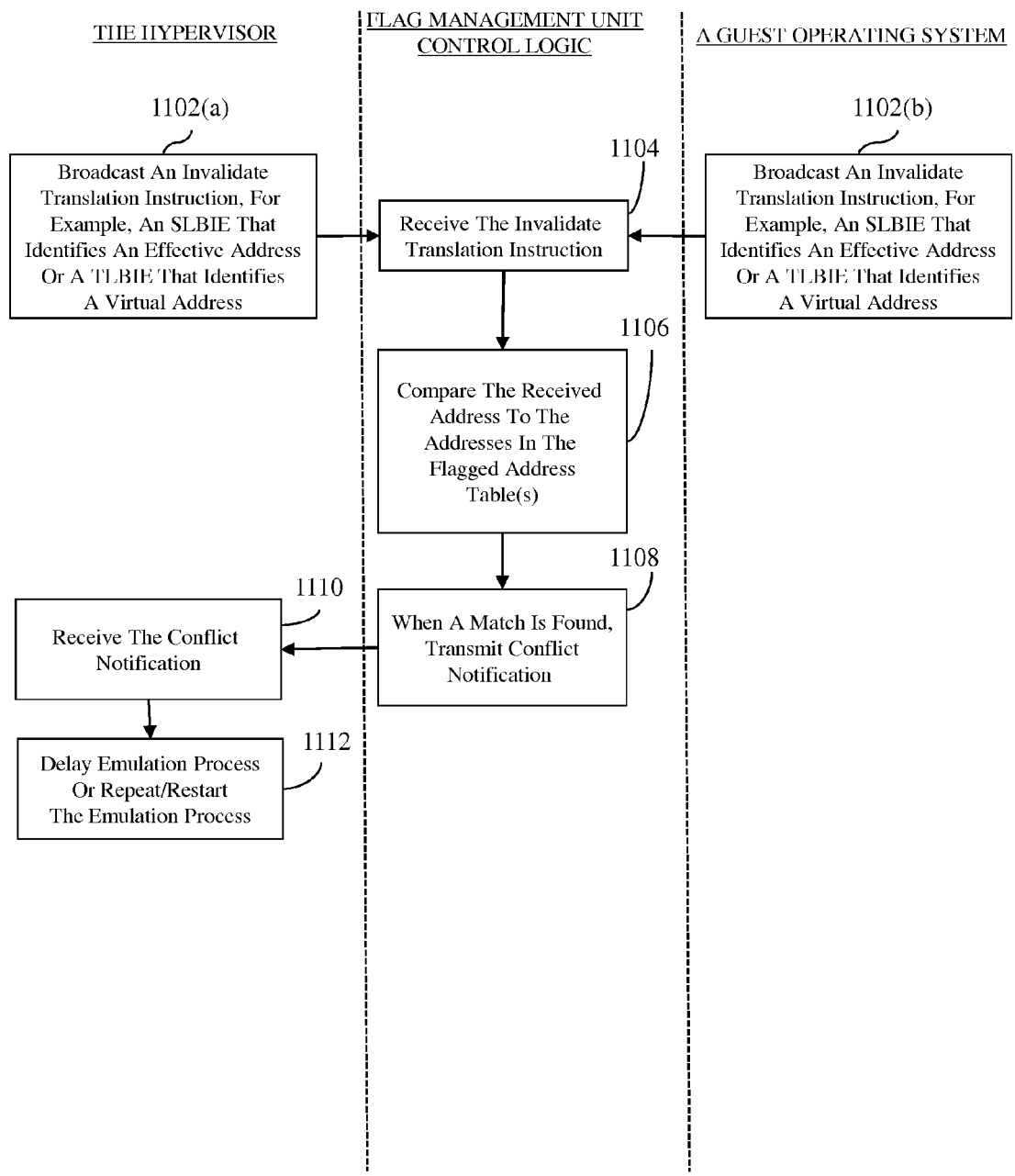
FIG. 11 is a flow diagram detailing alternative additional processes that can be performed during process 806 of FIG. 8 in order to eliminate a race condition between a translation operation performed by a hypervisor and a concurrent translation invalidation by the hypervisor or a given guest operating system; and, FIG. 12 is a schematic diagram illustrating a representative hardware environment for implementing the disclosed computer(s), method(s) and/or computer program product(s).

Alternatively, referring to FIG. 11 in combination with FIG. 2, an invalidate translation instruction (e.g., a segment look-aside buffer invalidate entry (SLBIE) instruction or a translation look-aside buffer invalidate entry (TLBIE)) can be broadcast by the hypervisor 221 (1102(*a*)) or the given guest operating system 222 (1102(*b*)) and received by the flag management unit 250 and, particularly, the control logic 255 thereof (1104). An address specified in the invalidate translation instruction can be compared (e.g., by the control logic 255) to the flagged addresses in the flagged address table(s) 259 (1106). For example, a second effective address specified in a SLBIE instruction can be compared to the flagged effective addresses 257 in a flagged effective address table 256 or a second virtual address specified in a TLBIE instruction can be compared to the flagged virtual addresses 252 specified in a flagged virtual address table 251. When a match is found (i.e., when a second effective address matches the first effective address stored in the flagged effective address table 256 or when the second virtual address matches the first virtual address stored in the flagged virtual address table 251), a conflict notification can be transmitted (e.g., by the flag management unit 250 over the system bus 201) to the hypervisor 221 regardless of which operating system broadcast the invalidate translation instruction (1108). This conflict notification can be received by the hypervisor 221, which can, in response to the conflict notification, take preventative action in order to prevent a translation error (1110)-(1112). Such action can include, for example, delaying the emulating process and, particularly, the translation stage at issue when it has yet to occur (e.g., delaying translation of the first effective address to the first virtual address when the translation invalidation pertains to a segment table entry or delaying translation of the first virtual address to the physical address when the translation invalidation pertains to a page table entry) or repeating the emulating process when the multi-stage translation has already occurred.

In any case, referring again to the flow diagram of FIG. 8, once the emulation process 806 has been completed, a clear flags instruction can be transmitted by the hypervisor 221 to the flag management unit 250, thereby causing the flag management unit 250 and, particularly, the control logic 255 thereof to clear both the first effective address and the first virtual address from the flagged address table(s) 259 (e.g., from the flagged effective address table 256 and the flagged virtual address table 251, respectively) (812).

Also disclosed herein are computer program products for the software 120, 220 of FIGS. 1 and 2, respectively. Each computer program product can comprise a computer readable storage medium that stores software and, particularly, one or more programs of instructions. The program(s) of instruction can be executable by a computer to perform the above-described method steps including, but not limited to, those method steps associated with the hypervisor 121, 221 and guest operating system(s) 122, 222.

Specifically, each computer program product disclosed herein can comprise a computer readable storage medium, which stores instructions executable by a computer to perform the above described process steps and/or methods. Accordingly, aspects of these techniques may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the disclosed techniques may take the form of a computer program product embodied in one or more computer readable medium(s) having computer readable program code embodied thereon.

Any combination of one or more computer readable medium(s) may be utilized. The computer readable medium may be a computer readable storage device or a computer readable signal medium. A computer readable storage medium is a tangible medium and may be, but is not limited to, any of the following: an electronic, magnetic, optical, electromagnetic, infrared, or semiconductor system, apparatus, or device, or any suitable combination of the foregoing. More specific examples (a non-exhaustive list) of the computer readable storage medium would include, but is not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

As mentioned above, the computer readable medium can alternatively comprise a computer readable signal medium that includes a propagated data signal with computer readable program code embodied therein, for example, in baseband or as part of a carrier wave. Such a propagated signal may take any of a variety of forms, including, but not limited to, electromagnetic, optical, or any suitable combination thereof. This computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the disclosed embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosed system, method and computer program products are described above with reference to flowchart illustrations and/or block diagrams. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 12:
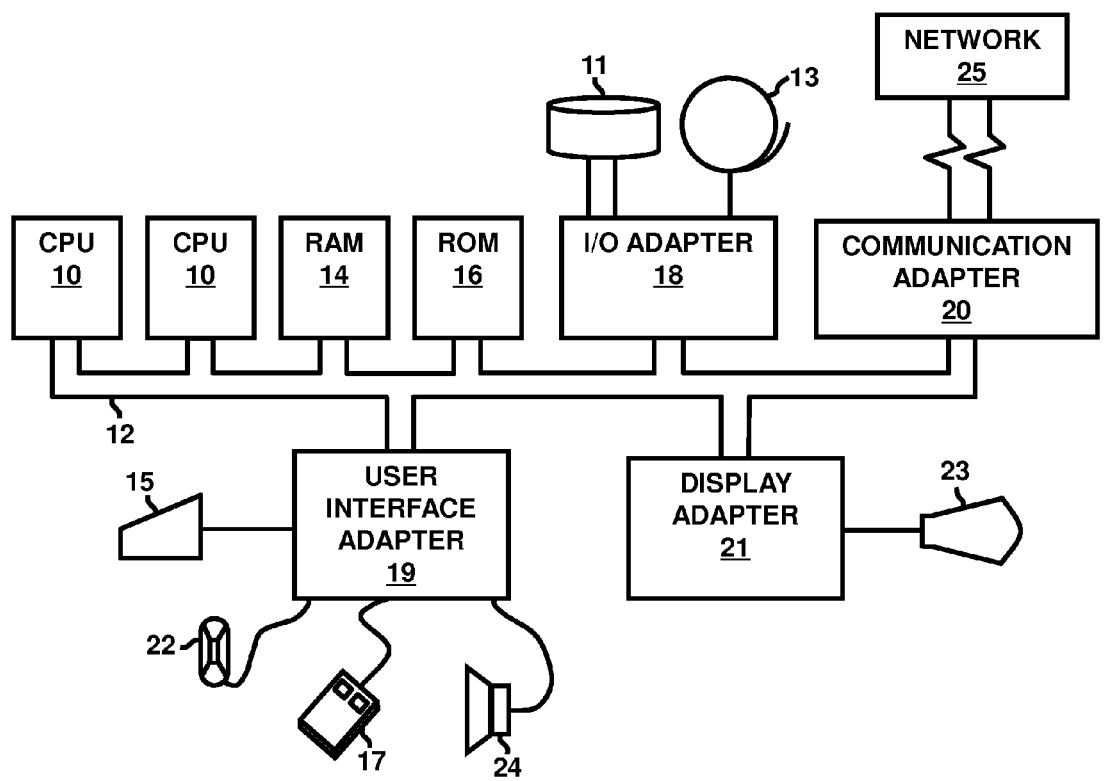

FIG. 12 is representative hardware environment for implementing the above-disclosed computer(s) or components thereof, method(s) and/or computer program product(s). This schematic drawing illustrates a hardware configuration of a computerized device, such as an information handling/computer system. The computerized device comprises at least one processor or central processing unit (CPU) 10. The CPUs 10 are interconnected via bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the computerized device. The computerized device can read the inventive instructions on the program storage devices and follow these instructions to execute the methodology of the disclosed embodiments. The computerized device further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the flowcharts and block diagrams in the Figures referenced above illustrate the architecture, functionality, and operation of the various possible implementations of the above disclosed system, method and computer program product. In this regard, each block in the flowchart or block diagrams may represent a module, segment, or portion of code, which comprises one or more executable instructions for implementing the specified logical function(s). It should also be noted that, in some alternative implementations, the functions noted in any block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should also be noted that the terminology used herein is for the purpose of describing the system, method and computer program product and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including", specify the presence of stated features, integers, steps, operations, elements, and/or components, but do not preclude the presence or addition of one or more other features, integers, steps, operations, elements, components, and/or groups thereof. Additionally, it should be understood that the corresponding structures, materials, acts, and equivalents of all means or step plus function elements in the claims below are intended to include any structure, material, or act for performing the function in combination with other claimed elements as specifically claimed.

Therefore, disclosed above are computers and methods that employ a mechanism for eliminating a race condition between a hypervisor-performed emulation process requiring a translation operation using one or more different types of translation tables (e.g., page tables and, if applicable, segment tables), and a concurrent translation table entry invalidation. Specifically, in the systems and methods, a hypervisor executed by a host processor controls at least one guest operating system also executed by the host processor. In controlling the guest operating system(s), the hypervisor can receive a storage access instruction associated with a specific virtual address (or, alternatively, associated with a specific effective address) and can emulate that storage access instruction. To emulate the storage access instruction, the hypervisor can perform a translation operation to acquire a specific physical address based on the address specified in the storage access instruction using one or more page tables and, if applicable, segment tables. The hypervisor can then access the specific physical address and complete the instruction. During emulation, flagged address table(s) can be used to eliminate the race condition. For example, any address(es) associated with a storage access instruction can be stored in flagged address table(s) and, upon receiving an invalidate translation instruction, a determination can be made as to whether or not the address associated with the invalidate translation instruction appears in a flagged address table. If so, additional action can be taken to prevent an error in the translation. After emulation of the storage access instruction, the address(es) associated with the storage access instruction can be cleared from the flagged address table(s).

The above-descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer comprising:
   a processor concurrently executing multiple operating systems comprising at least one guest operating system and a hypervisor;
   at least one memory accessible by said processor;
   a flag management unit in communication with said processor; and
   a flagged virtual address table storing flagged virtual addresses, said flagged virtual address table being stored in any of said flag management unit and said at least one memory and said flag management unit being operably connected to said flagged virtual address table,
   said hypervisor performing the following during said concurrently executing:
      receiving, from a given guest operating system, a storage access instruction requiring translation of a first virtual address into a physical address in said at least one memory;
      transmitting, to said flag management unit, a set flag instruction causing said flag management unit to add said first virtual address to said flagged virtual address table; and
      after said transmitting of said set flag instruction, emulating said storage access instruction,
   said flag management unit further performing the following during said emulating:
      receiving an invalidate translation instruction broadcast by one of said hypervisor and said given operating system, said invalidate translation instruction being associated with a second virtual address;
      comparing said second virtual address to said flagged virtual addresses stored in said flagged virtual address table; and
      when said second virtual address matches said first virtual address, taking additional action to prevent an error in said translation, and
   said hypervisor further transmitting, to said flag management unit after said emulating, a clear flag instruction causing said flag management unit to clear said first virtual address from said flagged virtual address table.

2. The computer of claim 1, further comprising at least one page table stored in said at least one memory and associating virtual addresses with physical addresses in said at least one memory, said emulating comprising:
   translating said first virtual address into said physical address using said at least one page table;
   accessing said physical address; and
   completing said storage access instruction.

3. The computer of claim 1,
   said additional action by said flag management unit comprising transmitting a conflict notification to said one of said hypervisor and said given guest operating system, and
   said one of said hypervisor and said given guest operating system performing any of the following in response to said conflict notification: delaying translation invalidation until said flag is cleared, repeatedly causing said invalidate translation instruction to restart until said flag is cleared and delaying an acknowledgement until said flag is cleared.

4. The computer of claim 3,
   said one of said hypervisor and said given guest operating system comprising said given guest operating system,
   said given guest operating system recognizing a perpetual conflict state and transmitting a forward progress interrupt to said hypervisor when said perpetual conflict state is recognized, and
   said hypervisor, in response to said forward progress interrupt, delaying said emulating when said emulating has yet to begin and repeating said emulating when said translation has already occurred.

5. The computer of claim 3, said one of said hypervisor and said given guest operating system comprising said hypervisor and said hypervisor recognizing a perpetual conflict state and, in response to said perpetual conflict state, delaying said emulating when said emulating has yet to begin and repeating said emulating when said translation has already occurred.

6. The computer of claim 1, said additional action by said flag management unit comprising delaying translation invalidation until said flag is cleared.

7. The computer of claim 1,
   said additional action by said flag management unit comprising transmitting a conflict notification to said hypervisor, and
   said hypervisor, in response to said conflict notification, delaying said emulating when said emulating has yet to begin and repeating said emulating when said translation has already occurred.

8. A computer comprising:
   a processor concurrently executing multiple operating systems comprising at least one guest operating system and a hypervisor;
   at least one memory accessible by said processor;
   a plurality of translation tables stored in said at least one memory and comprising:

at least one segment table associating effective addresses with virtual addresses; and at least one page table associating said virtual addresses with physical addresses in said at least one memory; and a flag management unit in communication with said processor; and at least one flagged address table storing flagged addresses comprising flagged effective addresses and flagged virtual addresses, said at least one flagged address table being stored in any of said flag management unit and said at least one memory and said flag management unit being operably connected to said at least one flagged address table, said hypervisor performing the following during said concurrently executing:

receiving, from a given guest operating system, a storage access instruction requiring translation of a first effective address into a physical address in said at least one memory;

transmitting, to said flag management unit, a first set flag instruction causing said flag management unit to add said first effective address to said at least one flagged address table;

after said transmitting of said set first flag instruction, emulating said storage access instruction, said emulating comprising:

translating said first effective address into a first virtual address using said at least one segment table;

transmitting, to said flag management unit, a second set flag instruction, causing said flag management unit to add said first virtual address to said at least one flagged address table;

translating said first virtual address into said physical address using said at least one page table;

accessing said physical address; and completing said storage access instruction, said flag management unit further performing the following during said emulating:

receiving an invalidate translation instruction broadcast by one of said hypervisor and said given guest operating system, said invalidate translation instruction being associated with a second address comprising one of a second effective address and a second virtual address;

comparing said second address to said flagged addresses stored in said at least one flagged address table; and when a match is found between said second address and one of said first effective address and said second effective address, taking additional action to prevent an error in said translation, and said hypervisor further transmitting, to said flag management unit after said emulating, a clear flags instruction causing said flag management unit to clear said first effective address and said first virtual address from said at least one flagged address table.

9. The computer of claim 8, said additional action by said flag management unit comprising transmitting a conflict notification to said one said hypervisor and said given guest operating system, and said one of said hypervisor and said given guest operating system performing any of the following in response to said conflict notification: delaying translation invalidation until said flag is cleared, repeatedly causing said invalidate translation instruction to restart until said flag is cleared and delaying an acknowledgement until said flag is cleared.

10. The computer of claim 9, said one of said hypervisor and said given guest operating system comprising said given guest operating system, said given guest operating system recognizing a perpetual conflict state and transmitting a forward progress interrupt to said hypervisor when said perpetual conflict state is recognized, and said hypervisor, in response to said forward progress interrupt, delaying said emulating when said emulating has yet to begin and repeating said emulating when said translation has already occurred.

11. The computer of claim 9, said one of said hypervisor and said given guest operating system comprising said hypervisor and said hypervisor recognizing a perpetual conflict state and, in response to said perpetual conflict state, delaying said emulating when said emulating has yet to begin and repeating said emulating when said translation has already occurred.

12. The computer of claim 8, said additional action by said flag management unit comprising delaying translation invalidation until said flag is cleared.

13. The computer of claim 8, said additional action by said flag management unit comprising transmitting a conflict notification to said hypervisor, and said hypervisor, in response to said conflict notification, delaying said emulating when said emulating has yet to begin and repeating said emulating when said translation has already occurred.

14. A method comprising:

concurrently executing, by a processor, multiple operating systems comprising a hypervisor and at least one guest operating system, said method further comprising, during said concurrently executing, receiving, by said hypervisor from a given guest operating system, a storage access instruction requiring translation of a first virtual address into a physical address in at least one memory;

transmitting, by said hypervisor to a flag management unit, a set flag instruction causing said flag management unit to add said first virtual address to a flagged virtual address table that stores flagged virtual addresses;

after said transmitting of said set flag instruction, emulating, by said hypervisor, said storage access instruction;

during said emulating, receiving, by said flag management unit, an invalidate translation instruction broadcast by one of said hypervisor and said given guest operating system, said invalidate translation instruction being associated with a second virtual address;

comparing, by said flag management unit, said second virtual address to said flagged virtual addresses stored in said flagged virtual address table;

when a match is found between said second virtual address and said first virtual address, taking, by said flag management unit, additional action to prevent an error in said translation; and after said emulating, transmitting, by said hypervisor to said flag management unit, a clear flag instruction causing said flag management unit to clear said first virtual address from said flagged virtual address table.

15. The method of claim 14, said emulating comprising:
translating said first virtual address into said physical address using at least one page table;
accessing said physical address; and
completing said storage access instruction.

16. The method of claim 14,
said additional action by said flag management unit comprising transmitting a conflict notification to said one of said hypervisor and said given guest operating system, and
said method further comprising performing, by said one of said hypervisor and said given guest operating system, any of the following in response to said conflict notification: delaying translation invalidation until said flag is cleared, repeatedly causing said invalidate translation instruction to restart until said flag is cleared and delaying an acknowledgement until said flag is cleared.

17. The method of claim 16, said one of said hypervisor and said given guest operating system comprising said given guest operating system and said method further comprising:
recognizing, by said given guest operating system, a perpetual conflict state;
transmitting, by said given guest operating system, a forward progress interrupt to said hypervisor when said perpetual conflict state is recognized; and
performing, by said hypervisor in response to said forward progress interrupt, any of delaying said emulating when said emulating has yet to begin and repeating said emulating when said translation has already occurred.

18. The method of claim 16, said hypervisor and said given guest operating system comprising said hypervisor and said method further comprising:
recognizing, by said hypervisor, a perpetual conflict state; and
performing, by said hypervisor in response to said perpetual conflict state, any of delaying said emulating when said emulating has yet to begin and repeating said emulating when said translation has already occurred.

19. The method of claim 14, said additional action by said flag management unit comprising delaying translation invalidation until said flag is cleared.

20. The method of claim 14,
said additional action by said flag management unit comprising transmitting a conflict notification to said hypervisor, and
said method further comprising:
delaying, by said hypervisor in response to said conflict notification, said emulating when said emulating has yet to begin; and
repeating, by said hypervisor in response to said conflict notification, said emulating when said translation has already occurred.

* * * * *